US008810368B2

(12) United States Patent
Sovio et al.

(10) Patent No.: US 8,810,368 B2
(45) Date of Patent: Aug. 19, 2014

(54) METHOD AND APPARATUS FOR PROVIDING BIOMETRIC AUTHENTICATION USING DISTRIBUTED COMPUTATIONS

(75) Inventors: Sampo Juhani Sovio, Riihimäki (FI); Vesa-Veikko Luukkala, Espoo (FI); Sergey Boldyrev, Söderkulla (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 13/074,823

(22) Filed: Mar. 29, 2011

(65) Prior Publication Data

US 2012/0249298 A1 Oct. 4, 2012

(51) Int. Cl.
*G05B 19/00* (2006.01)

(52) U.S. Cl.
USPC .......................................... 340/5.84; 340/5.83

(58) Field of Classification Search
CPC ........... G07C 9/00087; G07C 9/00158; G07C 2009/00095; G06F 21/32; G06Q 20/40145; G06Q 20/382; G06Q 20/40; G06Q 40/00; A61B 5/117; G06K 9/00
USPC ....................................... 340/5.82, 5.83, 5.84
See application file for complete search history.

(56) References Cited

U.S. PATENT DOCUMENTS

| | | | | |
|---|---|---|---|---|
| 6,112,225 | A | 8/2000 | Kraft et al. | |
| 6,173,259 | B1 | 1/2001 | Bijl et al. | 704/235 |
| 6,259,448 | B1 | 7/2001 | McNally et al. | |
| 6,327,568 | B1 | 12/2001 | Joost | 704/270.1 |
| 7,509,244 | B1 | 3/2009 | Shakeri et al. | 703/7 |
| 2002/0133461 | A1 | 9/2002 | Ramachandran | 705/43 |
| 2002/0188854 | A1 | 12/2002 | Heaven et al. | 713/186 |
| 2003/0046083 | A1 * | 3/2003 | Devinney et al. | 704/273 |
| 2003/0105623 | A1 | 6/2003 | Cyr et al. | 704/201 |
| 2005/0041788 | A1 | 2/2005 | Jan et al. | 379/88.18 |
| 2005/0219223 | A1 | 10/2005 | Kotzin et al. | 345/173 |
| 2005/0256876 | A1 | 11/2005 | Eidson | |
| 2006/0009980 | A1 | 1/2006 | Burke et al. | 704/270 |
| 2006/0123011 | A1 | 6/2006 | Stillion et al. | 707/10 |
| 2006/0129838 | A1 | 6/2006 | Chen et al. | 713/186 |
| 2006/0156385 | A1 * | 7/2006 | Chiviendacz et al. | 726/2 |
| 2007/0094023 | A1 | 4/2007 | Gallino et al. | 704/251 |
| 2008/0010067 | A1 | 1/2008 | Chaudhari et al. | 704/254 |
| 2008/0031496 | A1 | 2/2008 | Takagi | 382/115 |
| 2008/0072063 | A1 * | 3/2008 | Takahashi et al. | 713/186 |

(Continued)

FOREIGN PATENT DOCUMENTS

| | | | |
|---|---|---|---|
| CN | 101201894 | A | 6/2008 |
| WO | WO 2008/095761 | A1 | 8/2008 |
| WO | WO 2009/152338 | A1 | 12/2009 |

OTHER PUBLICATIONS

U.S. Appl. No. 12/484,801, filed Jun. 15, 2009, Boldyrev et al.

(Continued)

*Primary Examiner* — Omer S Khan
(74) *Attorney, Agent, or Firm* — Harrington & Smith

(57) ABSTRACT

An approach is provided for performing biometric authentication. A determination is made of biometric data from a user equipment having an associated user. Decomposition of the biometric data is caused into one or more closure primitives that represent computation closures of one or more processes of the user equipment. The user is selectively authenticated based on the decomposition of the biometric data.

16 Claims, 19 Drawing Sheets

(56) References Cited

U.S. PATENT DOCUMENTS

| | | | | |
|---|---|---|---|---|
| 2008/0317292 | A1 | 12/2008 | Baker et al. | 382/115 |
| 2009/0152343 | A1 | 6/2009 | Carter et al. | 235/379 |
| 2010/0011370 | A1 | 1/2010 | Kubo et al. | |
| 2010/0150353 | A1 * | 6/2010 | Bauchot et al. | 380/282 |
| 2010/0241827 | A1 | 9/2010 | Yu et al. | |
| 2011/0098056 | A1 | 4/2011 | Rhoads et al. | 455/456.1 |
| 2011/0138381 | A1 | 6/2011 | Hauser | 718/1 |

OTHER PUBLICATIONS

U.S. Appl. No. 12/571,575, filed Oct. 1, 2009, Boldyrev et al.
U.S. Appl. No. 12/797,284, filed Jun. 9, 2010, Oliver et al.
U.S. Appl. No. 12/825,043, filed Jun. 28, 2010, Sergey Boldyrev et al.
U.S. Appl. No. 13/108,596, filed May 16, 2011, Sergey Boldyrev et al.
U.S. Appl. No. 61/365,084, filed Jul. 16, 2010, Sergey Boldyrev et al.
Accelerating Innovation in the Desktop, Crooke. Accessed: Jun. 28, 2010, http://download.intel.com/pressroom/kits/events/computex2009/Crooke_Computex_presentation.pdf, pp. 1-23.
An Infrastructure for Distributed Computing and Context Aware Computing, Pandey et al., accessed on Dec. 28, 2010, http://www-users.cs.umn.edu/~terveen/ubicomp2003/pandey.pdf, pp. 1-2.
ARM Community Topics. Accessed: Jun. 28, 2010, http://infocenter.arm.com/help/index.jsp?topic=/com.arm.doc.ddi0360f/index.html, pp. 1-1.
ARM11MPCORE Processor. Accessed: Jun. 28, 2010, http://www.arm.com/products/processors/classic/arm11/arm11-mpcore.php pp. 1-4.
Category Theory Lecture Notes. Turi, Laboratory for Foundations of Computer Science, Univeristy of Edinburgh, Sep. 1996 to Dec. 2001, pp. 1-61.
Cell Broadband Engine resource center. Accessed: Jun. 28, 2010, http://www.ibm.com/developerworks/power/cell/index.html, pp. 1-1.
Distributed & Grid Computing, Jim Pinto, May 2003, http://www.jimpinto.com/writings/grid.html, pp. 1-5.
Distributed computing in a wireless environment, Barry James Whyte, Nov. 19, 2010, http://www.vtnews.vt.edu/articles/2010/11/111910-vbi-mobile.html, pp. 1-8.
Efficient Dispersal of Information for Security, Load Balancing, and Fault Tolerance, Rabin, Journal of the ACM, vol. 36(2), pp. 335-348, 1989, pp. 1-14.
Flexible Control of Downloaded Executable Content, Jaeger et al., ACM Transactions on Information and System Security, vol. 2, No. 2, May 1999, pp. 177-228.
Grand Central Dispatch, A better way to do multicore. Accessed: Jun. 28, 2010, http://images.apple.com/macosx/technology/docs/GrandCentral_TB_brief_20090903.pdf, pp. 1-6.
Grand Central Dispatch. Accessed: Jun. 28, 2010, http://developer.apple.com/technologies/mac/snowleopard/gcd.html, pp. 1-1.
Intel Hyper-Threading Technology. Accessed: Jun. 28, 2010, http://www.intel.com/technology/platform-technology/hyper-threading/index.htm, pp. 1-1.
K42. Accessed: Jun. 28, 2010, http://domino.research.ibm.com/comm/research_projects.nsf/pages/k42.index.html, pp. 1-6.
OpenCL—The open standard for parallel programming of heterogeneous systems. Accessed: Jun. 28, 2010, http://www.khronos.org/opencl/, pp. 1-6.
OpenMP, The OpenMP API specification for parallel programming. Accessed: Jun. 28, 2010, http://openmp.org/wp/openmp-specifications/, pp. 1-4.
Operating system concepts, IPC, RPC, 6th edition, Silberschatz et al., John Wiley & Sons, pp. 108-125, 2002.
Personal Semantic Web Through a Space Based Computing Environment, Oliver, et al. Middleware for Semantic Web 08 at ICSC'08, Santa Clara, CA, USA 2008, pp. 1-14.
Process Migration, Milogicic et al., Dec. 5, 1998, pp. 1-24. Accessed: http://www.hpl.hp.com/techreports/1999/HPL-1999-21.pdf.
Process Migration, Milogicic et al., Dec. 5, 1998, pp. 25-48. Accessed:.http://www.hpl.hp.com/techreports/1999/HPL-1999-21.pdf.
Process Migration, Milogicic et al., Feb. 1999, pp. 1-1. Accessed: http://www.hpl.hp.com/techreports/1999/HPL-1999-21.pdf.
Recovery Oriented Computing (ROC): Motivation, Definition, Techniques, and Case Studies, Patterson et al., Computer Science Technical Report UCB//CSD-02-1175, U.C. Berkeley, Mar. 15, 2002, pp. 1-16.
Singularity. Accessed: Jun. 28, 2010, http://research.microsoft.com/en-us/projects/singularity/, pp. 1-3.
Singularity: Rethinking the Software Stack, Hunt et al. Accessed: Jun. 28, 2010, http://research.microsoft.com/pubs/69431/osr2007_rethinkingsoftwarestack.pdf, pp. 1-13.
The Berkeley/Standford Recovery-Oriented Computing (ROC) Project. Accessed: Jun. 28, 2010, http://roc.cs.berkeley.edu/, pp. 1-4.
The Design and Implementation of a First-Generation Cell Processor, Accessed: Jun. 28, 2010, https://www-01.ibm.com/chips/techlib/techlib.nsf/techdocs/7FB9EC5D5BBF51ED87256FC000742186/$file/ISSCC-10.2-Cell_Design.PDF, Pham et al., pp. 1-3.
The L4 u-Kernel Family. Accessed: Jun. 28, 2010, http://os.inf.tu-dresden.de/L4/bib.html, pp. 1-10.
The Pairing-Based Crypto Lounge, Accessed: May 18, 2010, http://www.larc.usp.br/~pbarreto/pblounge.html, pp. 1-31.
Tracking RDF Graph Provenance using RDF Molecules, Ding et al., pp. 1-2. Accessed on Aug. 17, 2010, 2010, http://aisl.umbc.edu/resources/219.pdf.
White Paper, Optimizing Hardware for x86 Server Virtualization, Bozman, Aug. 2009, http://www.intel.com/Assets/PDF/WhitePaper/IDCchoosingvirthardware.pdf , pp. 1-18.
Xen Architecture Overview, Feb. 13, 2008, v. 1.2, http://wiki.xensource.com/xenwiki/XenArchitecture?action=AttachFile&do=get&target=Xen+Architecture_Q1+2008.pdf, pp. 1-13.
Xen on Arm: System Virtualization using Xen Hypervisor for ARM-based Secure Mobile Phones, Hwang et al., Consumer Communications and Networking Conference, CCNC 2008, 5th IEEE pp. 57-261.
XenServer. Accessed: Jun. 28, 2010, http://www.citrix.com/English/ps2/products/product.asp?contentID=683148, pp. 1-1.
Satyanarayanan M, "The Case for VM-Based Cloudlets in Mobile Computing", IEEE Pervasive Computing 2009, Oct. 1, 2009, doi:10.11 09/MPRV.2009.82, XP011278074, (9 pages).
Boldyrev S., et al, "Network and content aware information management", International Conference for Internet Technology and Secured Transactions, [online]. 2009. ICITST 2009. pp. 1-7.
Balandin S, et al, "Multimedia services on top of M3 smart spaces", Jul. 11, 2010, IEEE Region 8SIBICRON-2010, Irkutsk Listvyanka, Russia, Jul. 11-15, 2010, XP031737648., (5 pages).

* cited by examiner

100

500

METHOD AND APPARATUS FOR PROVIDING BIOMETRIC AUTHENTICATION USING DISTRIBUTED COMPUTATIONS

BACKGROUND

Mobile devices, which provide various methods of network connectivity, are now for many users becoming the primary gateway to the global Internet and also a major storage point for information. This information can also reside within a network "cloud." As the volume of information and associated processes continue to grow and develop in sophistication, management of and access to such information pose a major challenge, with respect to security and convenience. Although numerous authentication mechanisms have emerged, many of these approaches can readily be compromised with the authentication information itself being stolen or forged. Moreover, for conventional authentication procedures, the inputting of passcodes can be cumbersome, particularly for mobile devices with small form factors as well as for users who are handicapped so that conventional input mechanisms (such as typing) are hard to use.

Some Example Embodiments

Therefore, there is a need for an approach for providing authentication that is robust with regard to the capabilities of user devices and abilities of the associated users.

According to one embodiment, a method comprises determining biometric data from a user equipment having an associated user. The method also comprises causing, at least in part, decomposition of the biometric data into one or more closure primitives that represent computation closures of one or more processes of the user equipment. The method further comprises selectively authenticating the user based on the decomposition of the biometric data.

According to another embodiment, an apparatus comprising at least one processor, and at least one memory including computer program code, the at least one memory and the computer program code configured to, with the at least one processor, cause, at least in part, the apparatus to determine biometric data from a user equipment having an associated user. The apparatus is also caused to cause, at least in part, decomposition of the biometric data into one or more closure primitives that represent computation closures of one or more processes of the user equipment. The apparatus is further caused to selectively authenticate the user based on the decomposition of the biometric data.

According to another embodiment, a method comprises receiving, at a user equipment, an input signal representing biometric data associated with a user. The method also comprises generating a message including the biometric data for transmission to an authentication service. The biometric data is decomposed into one or more closure primitives that represent computation closures of one or more processes of the user equipment, wherein the user is authenticated based on the decomposition of the biometric data.

According to yet another embodiment, an apparatus comprising at least one processor, and at least one memory including computer program code, the at least one memory and the computer program code configured to, with the at least one processor, cause, at least in part, the apparatus to receive, at a user equipment, an input signal representing biometric data associated with a user. The apparatus is also caused to generate a message including the biometric data for transmission to an authentication service. The biometric data is decomposed into one or more closure primitives that represent computation closures of one or more processes of the user equipment, wherein the user is authenticated based on the decomposition of the biometric data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing biometric authentication using distributed computations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" or "smart space" refers to an aggregated information set from different sources. This multi-sourcing is very flexible since it accounts and relies on the observation that the same piece of information can come from different sources. For example, the same information (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other structures and conceptual description methods used to create models of information.

Figure 1A:
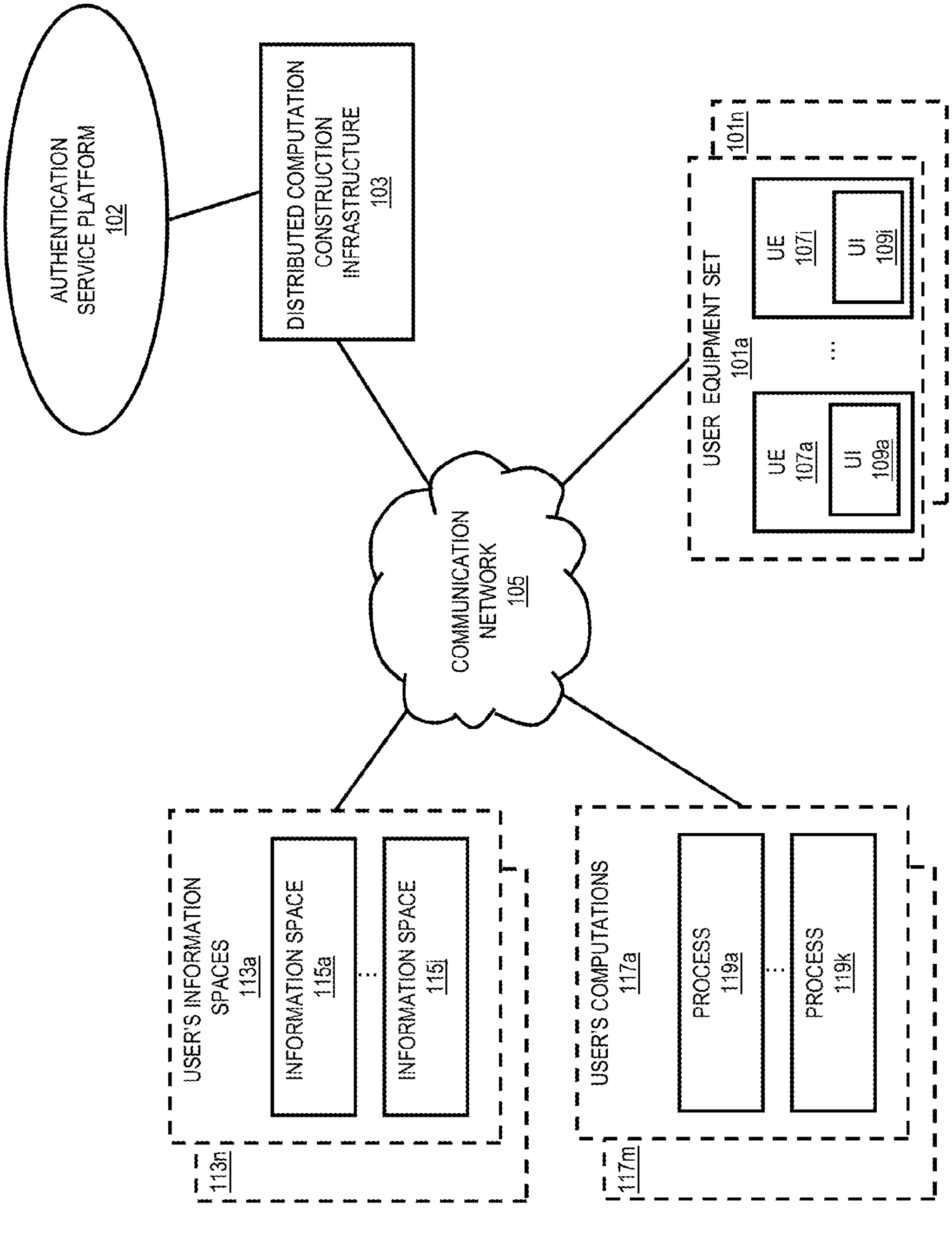
FIGS. 1A and 1B are, respectively, a diagram of a system capable of authenticating a user based on biometric data, and a flowchart of an authentication process, according to various embodiments.
Figure 1B:
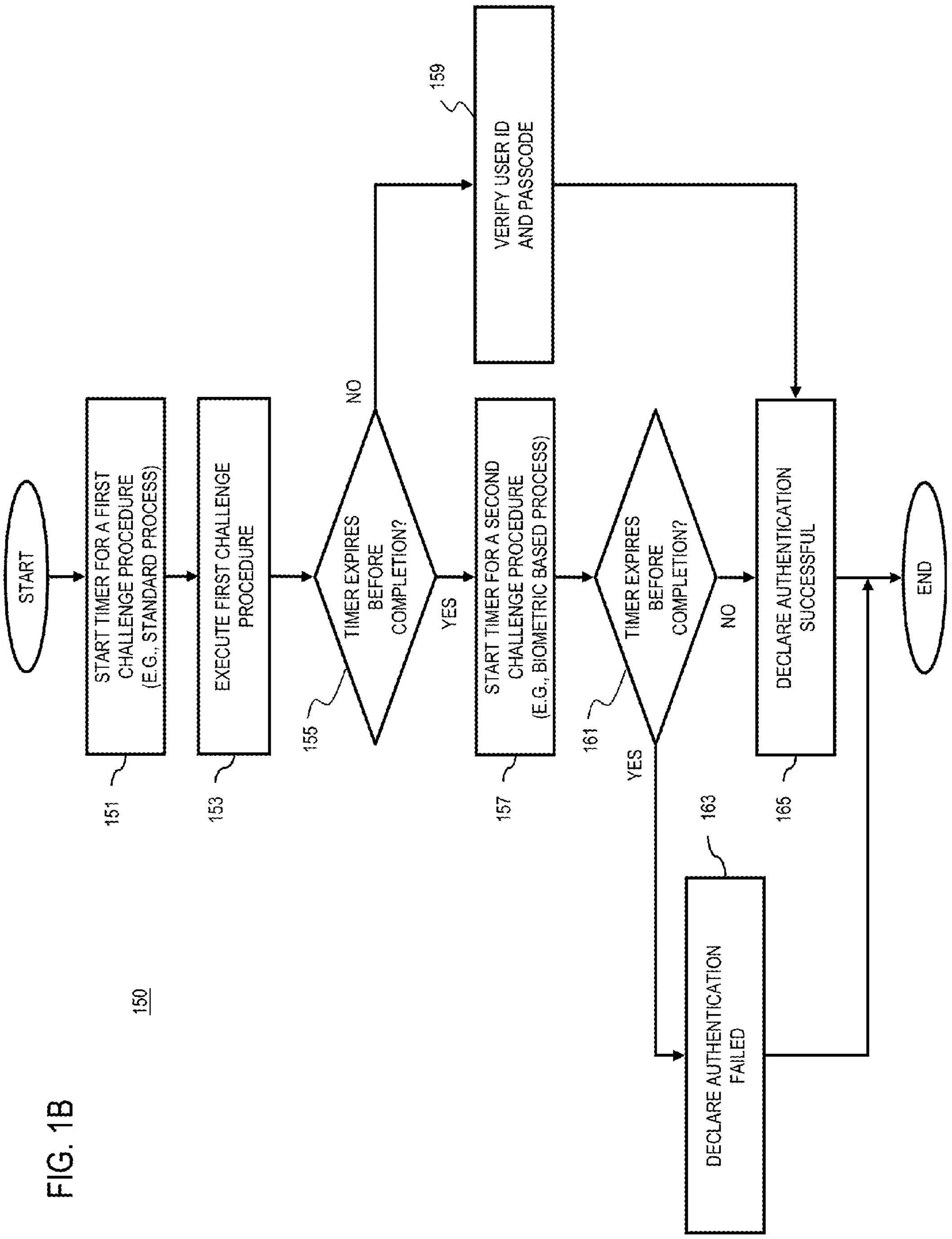

As used herein, the term reflective computing refers to the capability of a system to reason or act upon itself. A reflective system is a system that provides a representation of its own behavior which is amenable to inspection and adaptation. Reflection enables both inspection and adaptation of systems at run time. Inspection allows the current state of the system to be observed while adaptation allows the system's behavior to be altered at run time to better. Although various embodiments are described with respect to reflective computing, it is contemplated that the approach described herein may be used with other computation systems and architectures FIGS. 1A and 1B are, respectively, a diagram of a system capable of authenticating a user based on biometric data, and an authentication process, according to various embodiments. As shown in FIG. 1A, for the purposes of illustration, system 100 includes an authentication service platform 102 operating in conjunction with a distributed computation construction infrastructure 103 to provide effective authentication of users to access certain information over a communication network 105. In an embodiment, one or more sets 101*a*-101*n* of user equipment (UEs) UE 107*a*-107*i*, are configured to undergo multiple challenge procedures as part of an authentication procedure. Once authenticated, users can access information and/or utilize network resources.

To ensure a stronger authentication scheme, biometric data of the user has been integrated to the authentication processes. Biometric data is typically divided into two classes: physiological and behavioral. The first class, physiological, relating to the physical information about the user (such as DNA, fingerprint, etc.). The behavioral class involves information such as keyboard typing rhythm or human voice. Even with sophisticated biometric data approaches (e.g., using the human voice), attackers may steal this type of authentication information simply by recording the human voice during the authentication process. It is recognized that the identification needs to be bounded with some context that proves that the origin of the voiceprint is not forged. Another problem associated with traditional authentication mechanisms is that they assume that the user possesses certain capabilities (such as being literate for typing passwords and reading text).

To addresses these issues, system 100 provides dynamic adaptation of the identification methods in the authentication process based on time; and intuitive binding of biometric data and context in smart spaces.

An information space includes several distributed devices that communicate information (e.g. RDF graphs) via a shared memory such as a Semantic Information Broker (SIB). A device within an information space environment may store information locally in its own memory space or publish information to the semantic information broker. In the first case, the device is responsible for any process needed for combination or extraction of information, while in the second case the processes can be conducted by the semantic information broker. However, in many cases, the information may be organized as lists or sets of information that can include many data elements (e.g., a contact list, inventory of goods, business directory, etc.).

The basic concept of information space technology provides access to distributed information for various devices within the scope of the information space, in such a way that the distributed nature of the information is hidden from users and it appears to a user as if all the accessed information is stored on the same device. The information space also enables a user to have control over information distribution by transferring information between devices that the user has access to. For example, a user may want to transfer information among work devices, home devices, and portable devices. Current technologies enable a user of a mobile device to manipulate contexts such as data and information via the elements of a user interface of their user equipment. However, a user does not have control over the distribution of computations and processes related to or acting on the data and information within the information space. In other words, an information space in general does not provide a user (e.g., an owner of a collection of information distributed over the information space) with the ability to control distribution of related computations and processes of, for instance, applications acting on the information. For example, a contact management application that processes contact information distributed within one or more information spaces generally executes on a single device (e.g., with all processes and computations of the application also executing on the same device) to operate on the distributed information. In some cases (e.g., when computations are complex, the data set is large, etc.), providing a means to also distribute the related computations in addition to the information space is advantageous.

In one embodiment, system 100 introduces the capability to construct, distribute, and aggregate of computations as well as their related data. More specifically, to enable a user of an information space, who connects to the information space via one or more user equipment (e.g., including mobile devices and back end servers of service providers), to distribute computations among the one or more user devices or other devices with access to the information space, each computation is deconstructed to its basic or primitive processes or computation closures. As used herein, computation closures refer to relations and communications among various computations including passing arguments, sharing process results, flow of data and process results, etc. Once a computation is divided into its primitive computation closures, the processes within or represented by each closure may be executed in a distributed fashion and the processing results can be collected and aggregated into the result of the execution of the initial overall computation.

In one embodiment, each high context set of computations can be represented as closed sets of processes (e.g., transitive closures) such that closures can be executed separately (e.g., through distributed processing equipments). The transitive closures can be traversed in order to present the granular reflective processes attached to each particular execution context. The mechanism of system 100 provides distributed deductive closures as a recyclable set of pre-computed, computation closures that can be distributed among various devices and infrastructures or being shared among the users of one or more information space by being stored on any storage locations related to the information spaces. Furthermore, the mechanism provides user with visual programming as fragments of computation, where each representation on the user interface can be bound to the computation closure it is based on.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107*a*-107*i* are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107*a*-107*i* can support any type of interface to the user (such as "wearable" circuitry, etc.).

In one embodiment, the UEs 107*a*-107*i* are respectively equipped with one or more user interfaces (UI) 109*a*-109*i*. Each UI 109*a*-109*i* may include several UI elements (not shown) at any time, depending on the service that is being used. UI elements may be icons representing user contexts such as information (e.g., authentication information, music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, information spaces, and other infrastructure. The process migration can be initiated for example by means of single-cast (e.g., to just another UE 107) or multicast (e.g., to multiple other UEs 107). Additionally, process migration may be triggered via gesture recognition, wherein the user preselects a particular set of UI elements and makes a gesture to simulate "pouring" the selected UE elements from one device to another.

As seen in FIG. 1A, a user of UEs 107*a*-107*i* may own, use, or otherwise have access to various pieces of information distributed over a set 113*a* of information spaces 115*a*-115*j*. In the approach described herein, the information spaces 115*a*-115*j* may also be known as a computation space when one or more of the information spaces 115*a*-115*j* include one or more computation closures. The user can access the information via the set 101*a* includes UEs 107*a*-107*i* wherein each UE 107*a*-107*i* is equipped with one or more user interfaces (UI) 109*a*-109*i*. Furthermore, each UE 107*a*-107*i* may have access to a computation set 117*a* includes processes 119*a*-119*k* that can be used to manipulate the information stored in information spaces 115*a*-115*j* and produce results requested by the user of the UE 107.

In one embodiment, the distributed computation construction infrastructure 103 includes information about computations 117*a* and processes 119*a*-119*k* for each UE 107*a*-107*i*. The information may include information such as input parameters, input types and formats, output types and formats, process structure, flow of data, communication means and parameter passing among processes 119*a*-119*k*, etc.

The computations information enables a UE (e.g., anyone of UE 107*a*-107*i*) to divide computations into their primary computation closures, wherein each computation closure can be executed separately from other computation closures belonging to the same computation. For example, computations related to a music download may be divided into a search process for finding the most suitable download site, an verification process to determine whether the user is eligible for downloading from the site (e.g., this verification process can be executed in conjunction with the authentication service platform 102), an initialization process for verifying adequate resource (e.g. storage space) for the file to be downloaded, a process for verifying the type of the music file and associated playing environment, a process for determining whether the player is available on the UE 107, a process to activate the player after completion of the download, etc. In one embodiment, these processes or the computation closure derived from the processes may be executed independently from each other. Following execution of the independent processes, the data and parameters resulting from the execution can be exchanged to be able to aggregate results and make operation of the music application available in an information space environment. Moreover, division of the music-related computations into independent processes may vary based on factors such characteristics of the UE, restrictions of the download site, the music file type, the player type and requirements, etc. In one embodiment, division of computations into their primary processes or computation closures is managed by the distributed computation construction infrastructure 103. In addition, when the computation closures are serialized into, for instance, an information syntax such as RDF triples and stored via an information space, the information space incorporating the serialized computation closures are also known as a computation space.

By way of example, the UEs 107*a*-107*i* of sets 101*a*-101*n*, distributed computation construction infrastructure 103, and the information spaces 113*a*-113*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Referring to FIG. 1B, authentication service platform 102, in some embodiments, can employ multiple challenge procedures to authenticate a user. These processes can be defined, according to certain embodiments, as computations information for decomposition into computation closures. In step 151, process 150 (which may comprise one or more servers) can start a timer for a first challenge procedure (e.g., CAPTCHA ("Completely Automated Public Turing test to tell Computers and Humans Apart")). This first challenge procedure can be any standard process—e.g., utilizing a user identifier (ID) and a passcode (or password) to authenticate a user. Once the timer is started, the elapsed time is monitored with respect to the execution (step 153) and completion of the first challenge process; that is, whether the user has provided a response before the process times out. By way of example, a user device 107*a* can request authentication involving the supply of a valid user ID and passcode. If the timer expires, as in step 155, prior to completion of this process (i.e., the user does not supply the requested authentication information in time), the process 150 initiates another challenge procedure and starts another timer, per step 157. However, if the original timer does not lapse, the process 150 can simply verify the user supplied ID and passcode, as in step 159, without invoking the second challenge procedure. In this manner, if no response is obtained before a specified timeout, the challenge effectively is represented in a different format, such as an audio format. As such, users with less capabilities, in terms of the user equipment and/or users' limitations (e.g., illiterate or handicapped), can still be authenticated.

In one embodiment, the second challenge procedure utilizes biometric data, as will be more fully described with respect to FIGS. 2B, and 3A-3C. According to one embodiment, the biometric data can be the voiceprint or utterance(s) of the user. This second challenge procedure binds the source of biometric data to some context. The process 150 determines whether the timer has expired for this second challenge procedure (step 161); if so, the authentication is declared to have failed. Otherwise, the process 150 deems the user to be successfully authenticated, as in step 165.

By way of example, the use of voice recognition is explained in this biometric-based challenge process. Assuming, for instance, that authentication service requires "Alice" to authenticate herself, the authentication service platform 102 can support random and user friendly challenge mechanism to Alice. With voiceprints, the challenge can involve a word or set of words from a dictionary. Also, the user responses need not be simply repetition of the words, but it may be an answer to a question. Alternatively, images can be employed instead or in addition to words; such images would have associated with them certain expected responses (which may be semantic, for example a "smiley" or a smiling face represents several acceptable responses, e.g. "happy", "smiling", "good times", etc.). In one embodiment, in the case of words, these words can be spelled out, which is a relatively easy task. The semantic of the words is the first binding, and second binding is the time. Thus, Alice has limited time (for example 10 seconds) to spell out the challenge word(s). If authentication service 102 receives response from Alice in time before a predetermined response period or interval, then the service 102 can proceed with the decomposition into closure primitives. Hence, once the voiceprint is extracted, semantic processing can verify that Alice has spelled out the correct word(s).

The binding of the biometric data is facilitated by the distributed computation construction infrastructure 103, which is described as follows.

Figure 2A:
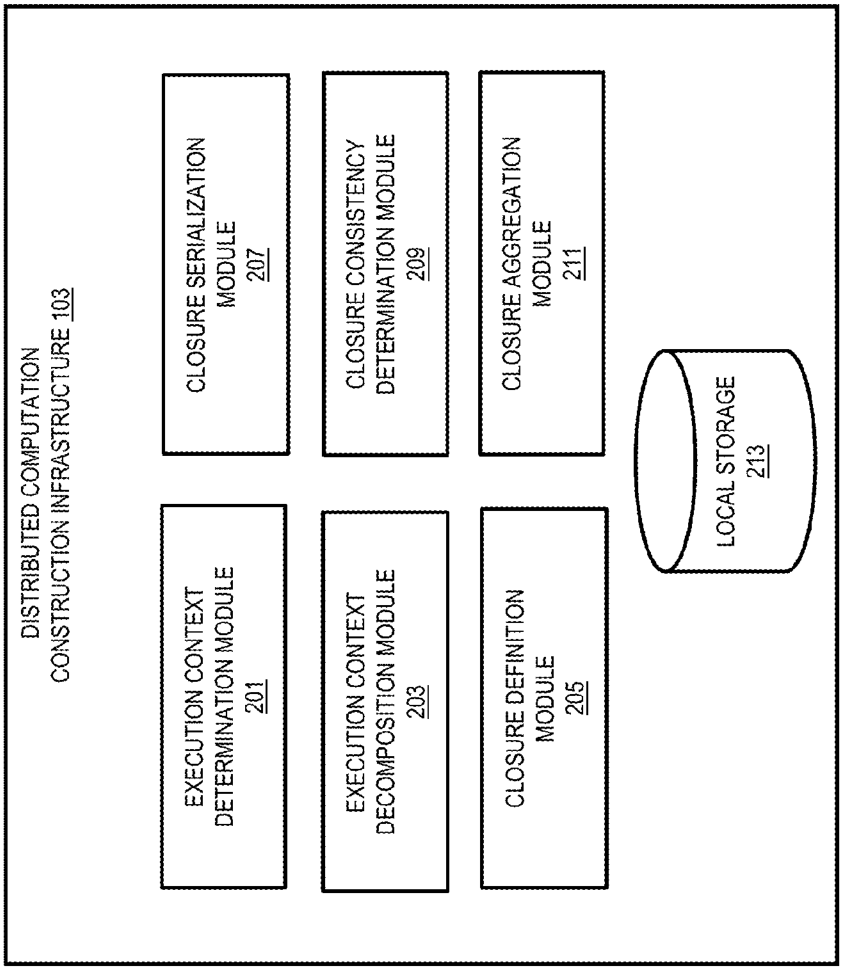
FIGS. 2A and 2B are, respectively, a diagram of the components of the distributed computation construction infrastructure, and a diagram of an authentication service platform, according to various embodiments.

FIG. 2A is a diagram of the components of the distributed computation construction infrastructure, according to one embodiment. By way of example, the distributed computation construction infrastructure 103 includes one or more components for construction and aggregation of distributed computations. It is contemplated that the functions of these components may be combined in one or more components or performed by other components of equivalent functionality. In this embodiment, the distributed computation construction infrastructure includes an execution context determination module 201, an execution context decomposition module 203, a closure definition module 205, a closure serialization module 207, a closure consistency determination module 209, and a closure aggregation module 211.

The distributed computation construction infrastructure 103 receives a request for computation distribution. In one embodiment, the request may have been generated by a UE 107 based on a user gesture such as for example pushing an icon of the UI 109 towards another UE 107 which may indicate that the user wants the process associated with the icon to be executed in the other UE 107. It is contemplated that an authentication procedure may need to be performed to have the process executed by the other UE 107. In another embodiment, the request for computation distribution may be generated by a component of an information space linked to the UE 107, by an independent component having connectivity to the UEs 107 and the information spaces via the communication network 105, or a combination thereof.

In some embodiments, the request for computation distribution may be initiated by determining to detect an event for specifying one or more computation closures for transfer among a first device, a second device, and/or a back end server (e.g., a cloud computing server). It is contemplated that the transfer may either from the first device to second device and/or the back end server, or from the second device and/or the back end server to the device. Further, the event may include a user input directing the distribution, a determination by the distributed computation construction infrastructure 103, a computation or bandwidth load balancing event, a determination of available network or computational resources, and the like.

The request for computation distribution may include information about the computation that is going to be distributed, including input, output, processing requirements, etc. The request may also include information about the origin and the destination of a computation. For example, a user may want to distribute the computations associated with encoding a video file from one format to another (a typically highly processor and resource intensive task). In this example, the video file is stored in the user's information space 115 or otherwise available over the communication network 105 (e.g., downloaded from a source over the Internet), and therefore accessible from the UEs 107. Accordingly, the user may make a manual request to distribute the computations associated with the video encoding to one or more other devices, a backend server, cloud computing components, and/or any other component capable of performing at least a portion of the encoding functions. By way of example, the manual request may be made via a graphical user interface by dragging an icon or other depiction of the computations to command areas depicted in the user interface. These command areas, for instance, may be representative of physical or virtual locations of the other UEs 107 or devices that can support or perform the distributed computations. In other cases, the distribution can be initiated automatically by the system 100 based on one or more criteria via a request generator (not shown) in conjunction with the distributed computation construction infrastructure 103.

In one embodiment, following the receipt of the computation distribution request, the execution context determination module 201 retrieves and analyzes the information regarding the computation and determines the execution components involved in the computation. This module 201 can assist the authentication service platform 102 in decomposing the user response into closure primitives. For the above example, the execution context may include video playing, audio playing, audio recording, etc and related settings, parameters, memory states, etc. The identified execution context may be stored in a local storage 213, in a storage space associated with the information space 113*a*-113*n*, sent directly to the execution content decomposition module 203, or a combination thereof.

In another embodiment, the execution context decomposition module 203 breaks each execution context into its primitive or basic building blocks (e.g., primitive computation closures) or the sub-processes of the whole execution context. For example the video playing execution may be decomposed into computations or processes that support tasks such as, searching for available players, check the compatibility of video file with the players found, select the player, activate the selected player, etc. It is contemplated that an authentication procedure may need to performed to play the video. Each of the decomposed sub-processes may have certain specifications and requirements to effect execution of the processes in an information space 115 or computation space such as input and output medium and type, how parameters or results are to be passed to other processes, runtime environments, etc. In order for a process to be executed in a standalone fashion without being part of a larger process, a computation closure can be generated for the process. A computation closure includes the process and the specifications and requirements associated with the process that can be executed independently for subsequent aggregation.

In one embodiment, the closure definition module 205 generates computation closures for the sub-processes extracted by the execution context decomposition module 203 and stores the closures in the database 213. The stored closures may be used for slicing computations into smaller independent processes to be executed by various available UEs 107*a*-107*i*, using the data which may be stored on the distributed information spaces 115*a*-115*j*.

In another embodiment the local storage 213 is used for storing cached computation closures from a remote server, wherein a remote server may be any type of backend device having connectivity to the distributed computation construction infrastructure 103 via the information spaces 113 and the communication network 105. The remote server may also be another device such as a UE 107-107*n*. Additionally, the local storage 213 may contain local computation closures which may not be completely synchronized with the rest of the devices and utilized only locally.

In yet another embodiment, the closure serialization module 207 utilizes the defined closures by closure definition module 205 and produces the serialized granular computation elements.

In one embodiment, the closure serialization may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each includes three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
|---|---|---|
| uri: // . . . /rule#CD-introduction, | rdf: type, | uri: // . . . /Rule |
| uri: // . . . /rule#CD-introduction, | uri: // . . . /rule#assumption, | "c" |

The granularity may be achieved by the basic format of operation (e.g. RDF) within the specific computation environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces.

In certain embodiments serializing the closures associated with a certain execution context enables the closures to be freely distributed among multiple UEs 107 and/or devices including remote processors associated with the UEs 107 by one or more user information spaces 113*a*-113*n* via the communication network 105. The processes of closure assigning and migration to run-time environments may be performed automatically based on factors such as the required processing power for each process, system load, capabilities of the available run-time environments, etc. Following the migration of each computation closure to its designated run-time environment, the run-time environment may communicate with the distributed computation construction infrastructure 103 regarding the receipt of the closures through components referred to as agents. Upon receiving the communication from an agent, closure consistency determination module 209 verifies the consistency of the closures which, as explained before, are in RDF graph format. The consistency verification ensures that the computation closure content for each closure is accurate, contains all the necessary information for execution, the flow of data and instructions is correct according to the original computation and has not been damaged during the serialization and migration process. If the closures pass the consistency check or is otherwise approved, per step 211, the closure aggregation module 211 reconstructs each component of the execution context based on the content of the computation closures. Once an execution context is reconstructed, the agents of the run-time environment can resume the execution of the execution context component that it initially received as computation closures in RDF format. In one embodiment, the resumption of the execution may be combined with one or more other results of other executions of at least a portion of the execution context.

Figure 12:
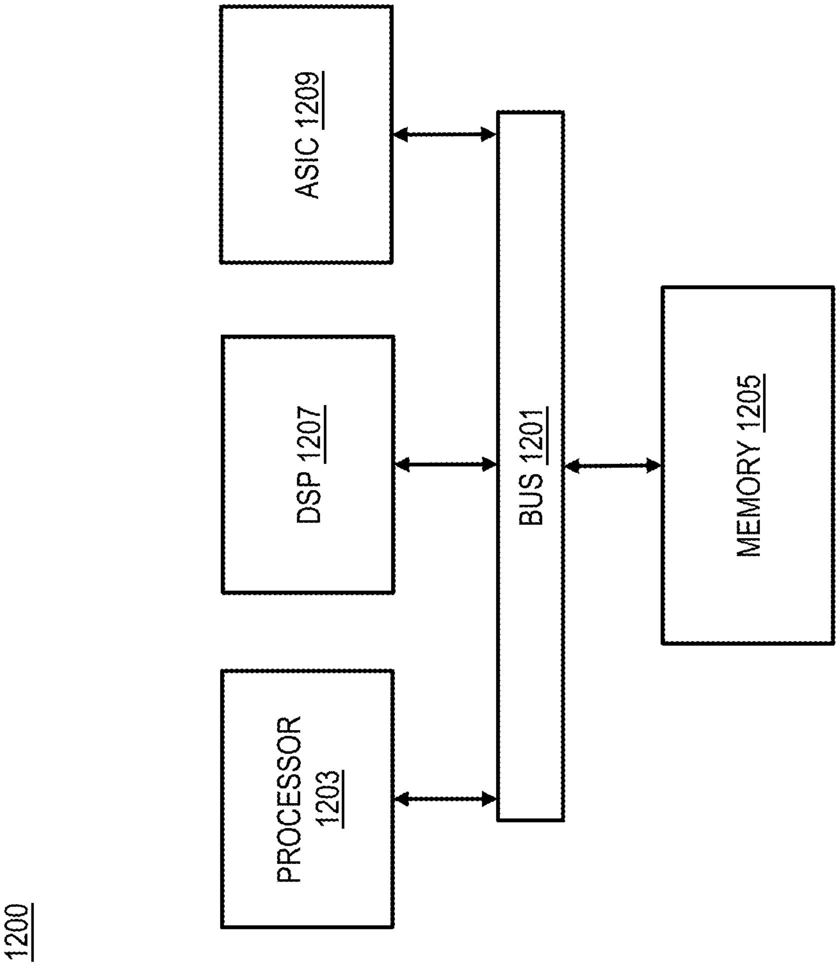
FIG. 12 is a diagram of a chip set that can be used to implement an embodiment of the invention.

To construct the distributed computations, in one embodiment, the distributed computation construction infrastructure 103 performs such process, for instance, a chip set including a processor and a memory as shown in FIG. 12.

The distributed computation construction infrastructure 103 identifies a user context, can refer to the type of activity that user is conducting on one or more UEs. A user context may be listening to music, talking on the phone, text messaging, playing a game, working with an application, etc. The execution context determination module 201 can determine a collection of executions and processes associated with the user context. Depending on the type of a user context various processes and executions may be performed. For example, playing a game may involve processes such as audio/visual presentation, search, etc. It is contemplated that an authentication procedure may need to be performed to play the game. The execution context decomposition module 203 breaks the execution context into smaller processes that can be executed independently and their combination may reconstruct the original execution context. The closure definition module 205 receives the decomposed processes and generates computation closures equivalent of each process. Each closure is a standalone process that can be executed independently from the other closures. Following the definition of computation closures, the closure serialization module 207 serializes the closures according to an information syntax format. By way of example, the serialization process may include identification of factors such as input, output, parameter exchange, hardware requirements that are required for proper execution of a process. The factors may be linked, attached or assigned to the closure to be further utilized for the execution. A serialized closure is ready for migration to the desired run-time environment. This process can be adapted to support authentication.

Figure 2B:
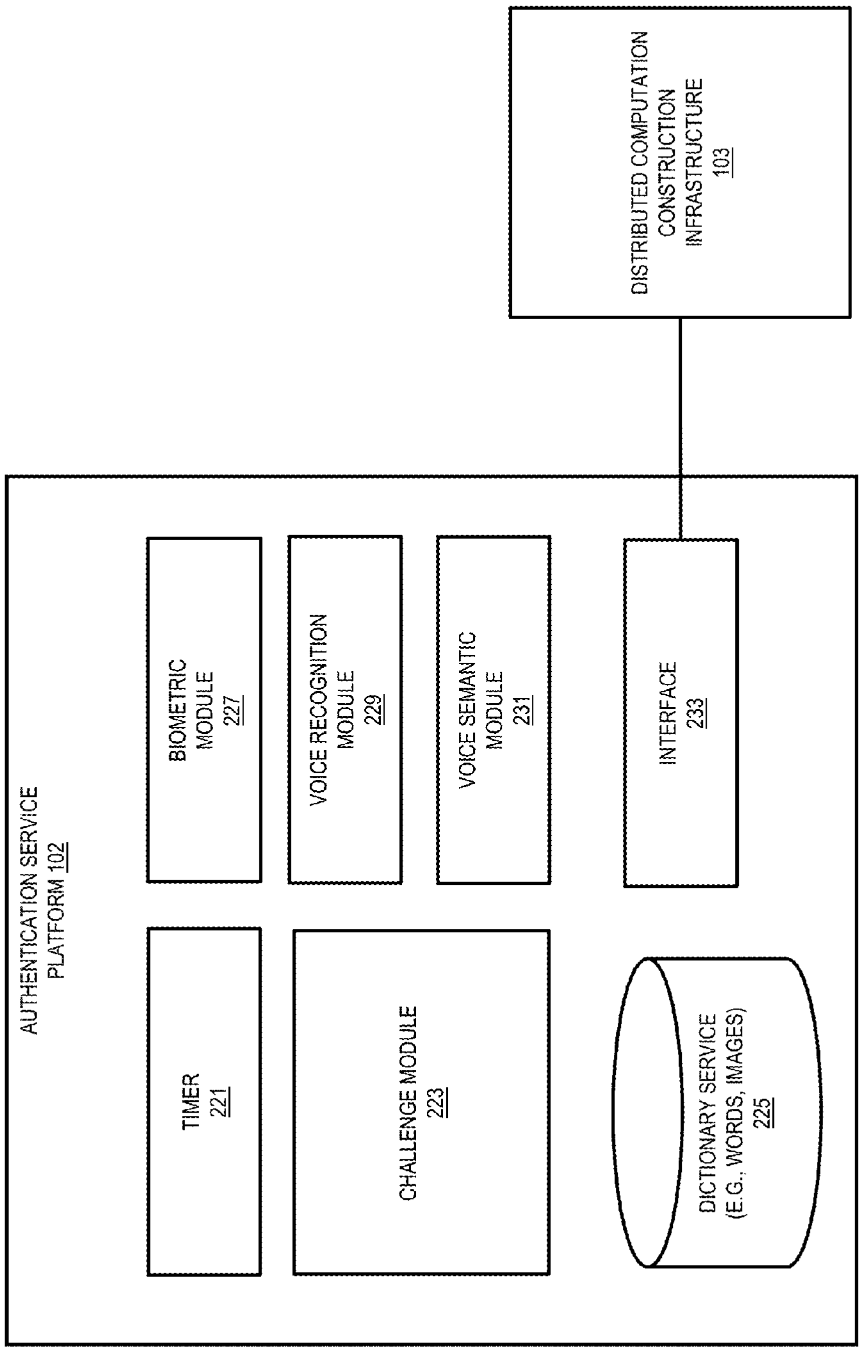

As seen in FIG. 2B, authentication service platform 102 includes a timer 221 that permits binding of timing information into the authentication procedure by tracking timer values for each of the challenge procedures. This authentication procedure can be performed via challenge module 223, which accesses a dictionary service 225. This service 225 can include a dedicated database containing words as well as images for use in the biometric-based challenge process, according to one embodiment. In certain embodiments, a biometric module 227 processes responses from users to verify the biometric data, which can include a voiceprint, an utterance as well as textual information. In the case of voiceprints as the biometric information, the biometric module 227 can utilize the services of a voice recognition module 229 and the voice semantic module 231. Under this scenario of FIG. 2B, authentication service platform 102 communicates with the distributed computation construction infrastructure 103 to decompose the responses into closure primitives, as further elaborated in FIGS. 3A-3C.

Figure 3A:
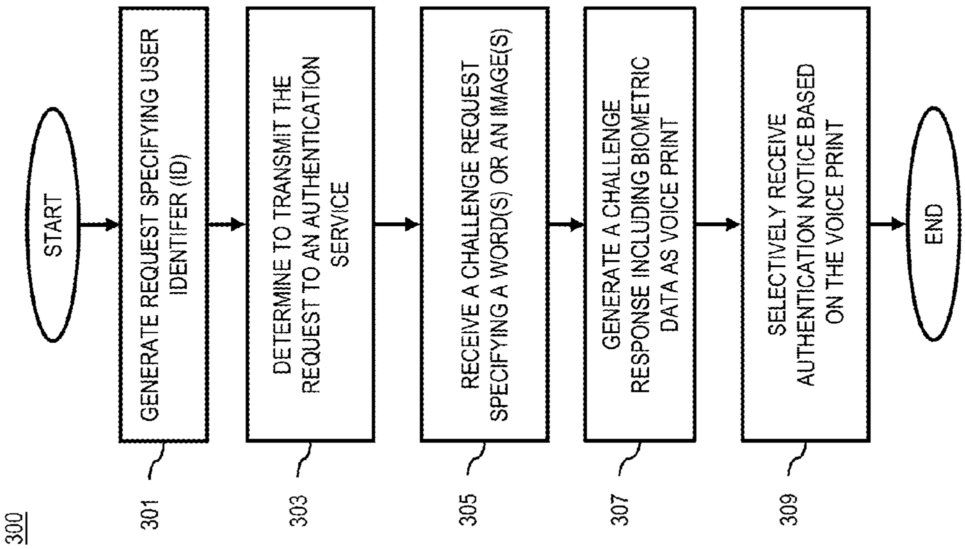
FIGS. 3A and 3B are flowcharts of processes for authenticating a user based on biometric data, according to various embodiments.
Figure 3B:
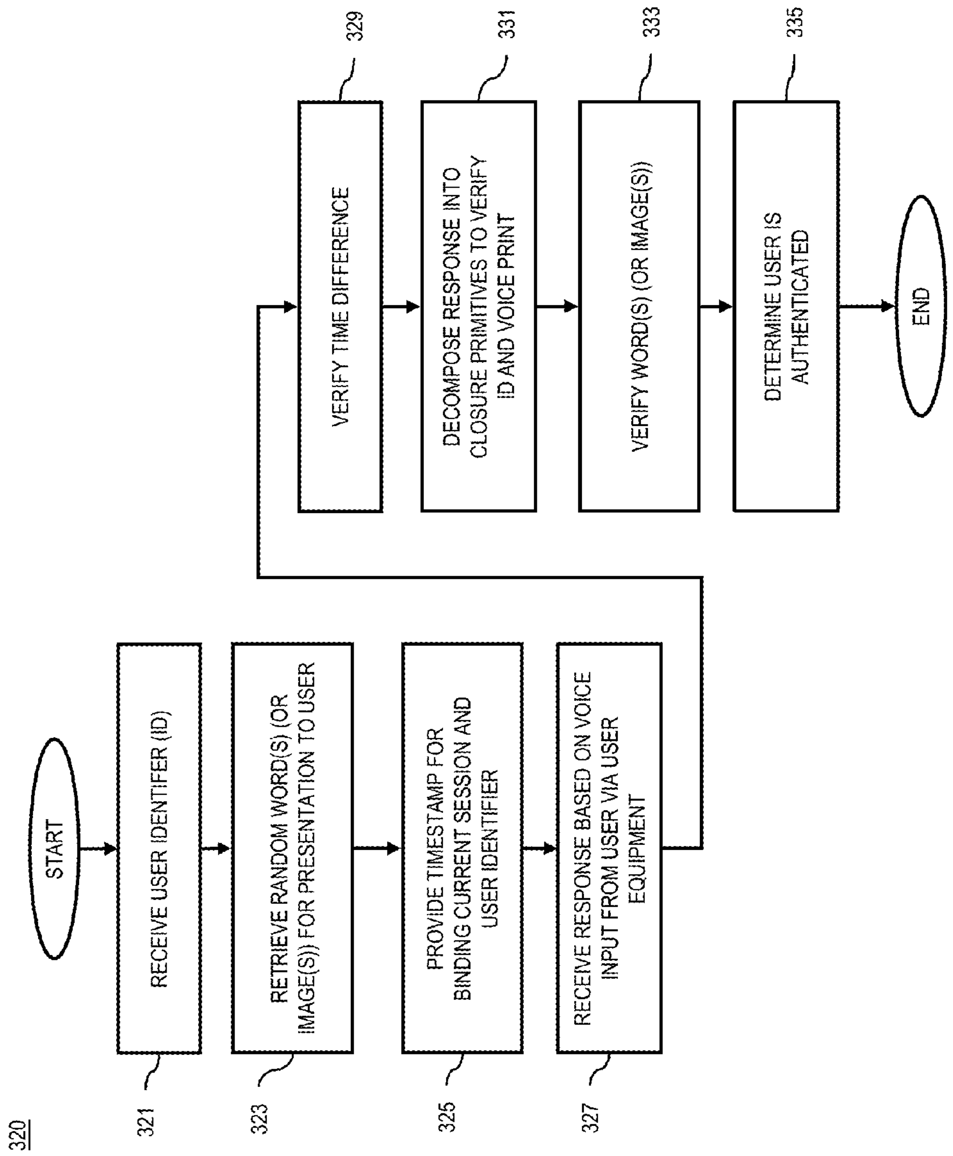

FIGS. 3A and 3B are flowcharts of processes for authenticating a user based on biometric data, according to various embodiments. For the purposes of explanation, process 300 of FIG. 3A is from the perspective of a user equipment, e.g., UE 107*a*. In step 301, process 300 generates a request specifying a user identifier (ID). Next, the process 300 determines to transmit the request to authentication service platform 102, as in step 303. After transmitting the request to the platform 102, a challenge request, in turn, is received from the platform 102 (step 305). The challenge request, in one embodiment, specifies one or more words that the user is prompted to spell "out loud" to produce for capturing as an audio signal. Alternatively, or additionally, the challenge involves an image to invoke an spoken expression from the user. At the user equipment 107*a*, the voiceprint (constituting the biometric data) of the audio signal is provided as part of the challenge response, per step 307. Assuming the authentication service platform 102 can verify the utterances in terms of the voiceprint and the semantics of the words, the user can then be authenticated (step 309).

From the perspective of the authentication service platform 102, this platform 102 can serve one or more users concurrently, according to one embodiment. As shown in FIG. 3B, process 300 (as executed by platform 102) receives the ID from UE 107*a*, as in step 321. Next, process 300, using challenge module 223, retrieves media, per step 323, in form of one or more words (or one or more images) from the dictionary service 225. By way of example, the media can include both words and/or images specified by the users and/or a service provider associated with the authentication service. Process 320 can, at this point, provide a timestamp, via timer 221, for binding the current session and user ID, as in step 325. In step 327, platform 102 receives a challenge response based on, for example, a voice input from the user via UE 107*a*.

In step 329, process 320 verifies the time difference to ensure that the challenge process does not exceed a certain time threshold. The time difference is computed using the timestamp information. Next, the response, which includes the biometric data, is decomposed into closure primitives to verify the user ID and voiceprint (step 331). Next, the actual word(s) and/or image(s) are verified at a semantic level, as in step 333. Assumption the verifications can be determined, process 320 declares the authentication of the requesting user to be successful (step 335).

The above processes is now described with respect to a use case involving biometric data based on words (or phrases) supplied to the user.

Figure 3C:
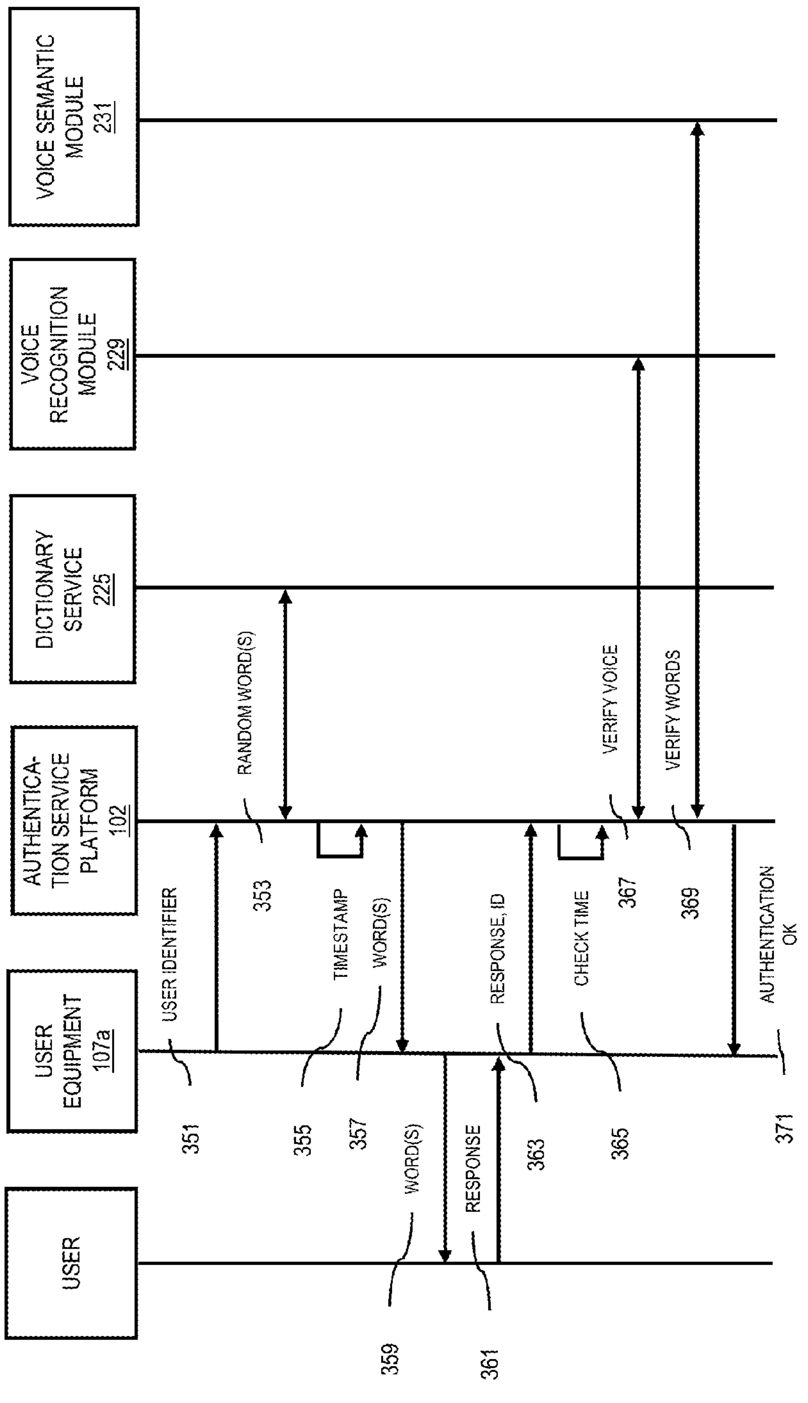
FIG. 3C is a ladder diagram of an authentication process, according to one embodiments.

FIG. 3C is a ladder diagram of an authentication process, according to one embodiments. By way of example, this process describes the behavior of audio-based authentication. An initial, text-based challenge phase is not described (see FIG. 1B), and the triggering of this phase, as noted, can be achieved by a timeout value. In this example, voice response is simply repeated using the words that are presented to the user via user equipment 107*a*. However, it is contemplated that biometric data can be employed.

As seen, the authentication procedure involves user equipment 107*a* sending the identifier of the user to the authentication service 102 (step 351). Authentication service 102 then retrieves a random word or set of words from the dictionary service 225, per step 353. In step 355, authentication service 102 provides a timestamp t0 for binding of the current session and identifier. In step 357, user equipment 107*a* receives the challenge word(s), and presents them to the user, as in step 359, either visually or aurally via UI 109*a*. The user inputs or otherwise provides a voice response (step 361) based on the received challenge word(s). The response, along with the user ID, is supplied to the authentication service 102, as in step 363. In step 365, authentication service 102 verifies the time difference between the current time t1 and t0 is smaller than a predefined limit; if t1−t0>limit, then the authentication fails.

Otherwise assuming the user supplied the information in a timely manner, the authentication service 102 utilizes the voice recognition module 229 to verify that the ID corresponds to the voiceprint—i.e., the voiceprint matches with the user (step 367). In step 369, authentication service 102 utilizes the voice semantic module 231 to verify that words that the user spelled out are the challenge words. In step 371, the authentication service 102 determines the authentication to be successful.

The described processes, according to certain embodiments, advantageously provide increased security and usability. For example, the binding is much more difficult to forge or replay than simple biometric information. Also, the security provides an intuitive approach, thereby having greater appeal to the general user. With respect to usability, users need not input lengthy passwords (which may be difficult to remember—assuming a strong passcode), which is particularly cumbersome if the entry is via a keyboard on a small mobile device (e.g. cellular phone). Further, the approach provides increased adaptability for different kinds of users.

To better appreciate the described authentication processes, it is instructive to detail the processes associated with distributed computations, as provided in FIGS. 4-10.

Figure 4:
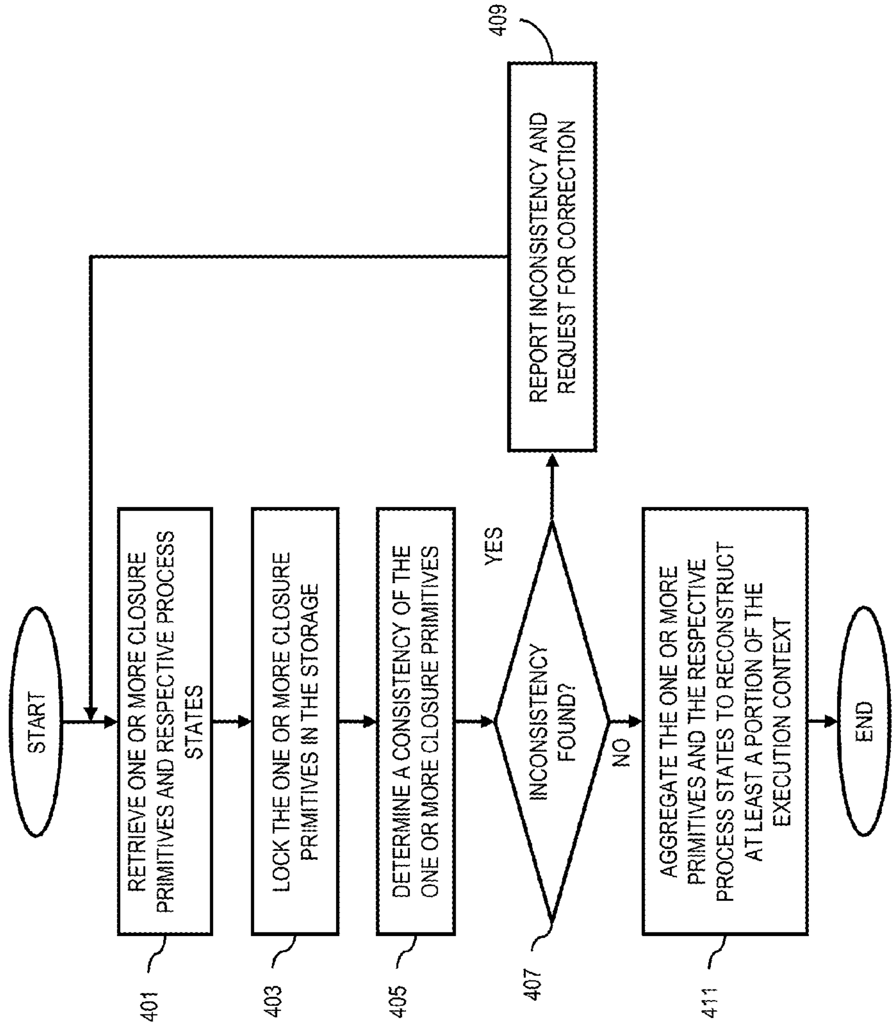
FIG. 4 is a flowchart of a process for aggregating distributed computations, according to one embodiment.

FIG. 4 is a flowchart of a process for aggregating distributed computations, according to one embodiment. In one embodiment, in step 401 the distributed computation construction infrastructure 103 retrieves the closures and their process states from the serialized closures received at a run-time environment via migration. As in step 403 the distributed computation construction infrastructure 103 locks the retrieved closures in the storage 213. The locking process protects the content of the closures and prevents concurrent access to the closures by multiple components of the distributed computation construction infrastructure 103 that may cause conflicts or data integrity issues arising from multiple executions of the same closures. In step 405, the closure consistency determination module 209 verifies the consistency of the closure contents. The consistency verification process checks the logical relationship among closures, process states, data flow and parameter exchange among closures, etc. Approval of closure consistency assures a correct aggregation process into the original execution context. In step 407, the distributed computation construction infrastructure 103 checks whether the closure consistency has been approved by the closure consistency determination module 209. In step 407 the closure aggregation module 211 checks the results of closure consistency verification.

If the consistency is not approved, the closure aggregation module 211 may report the error to the execution context decomposition module 203 per step 409 and request correction. In one embodiment, upon receiving the alert, the execution context decomposition module 203 may investigate the reason for occurrence of the error. Once the reason is detected, the execution context decomposition module 203 may take action for resolving the issue, for example by restarting the whole process of context decomposition process. The closure consistency determination module may alert the closure definition module if the issue is a closure definition error, or may initiate requesting process related information from related resources to ensure that the initially received process requirements were accurate. In one embodiment, each module of the distributed computation construction infrastructure 103 may verify its own previous results for accuracy. In another embodiment, a separate module may be added for troubleshooting.

If the closure consistency is approved, per step 411 the closure aggregation module 211 aggregates the primitive closures and utilizes the related requirements and information such as respective process starts to reconstruct the original execution context or a portion of the context. This is because the execution context may have been decomposed into several parts in step 405 and each decomposed part may have been serialized into a set of one or more computation closures per step 407. Therefore, each serialized set of closures may have been migrated to and executed by a different run-time environment. The execution of aggregated closures may then be resumed by the agents of each run-time environment.

Figure 5A:
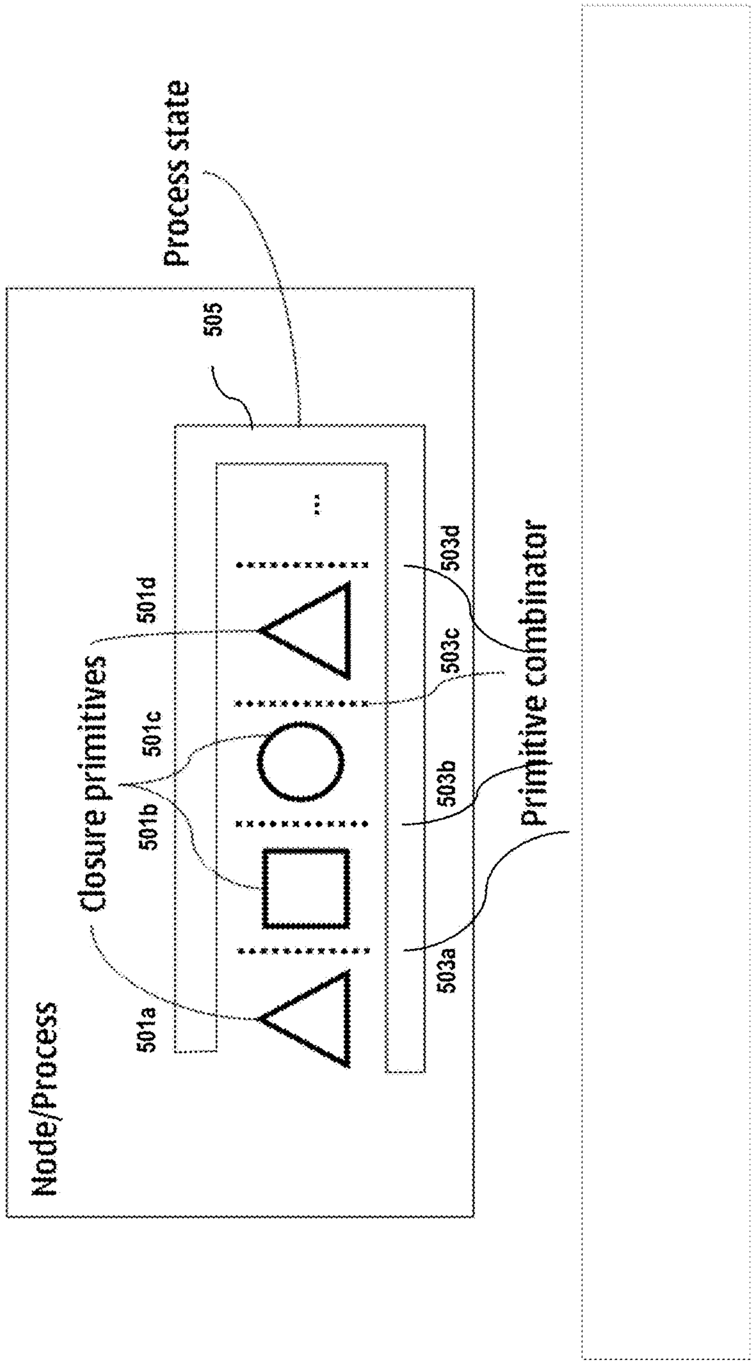
FIGS. 5A-5C are diagrams of a computation distribution, according to various embodiments.
Figure 5B:
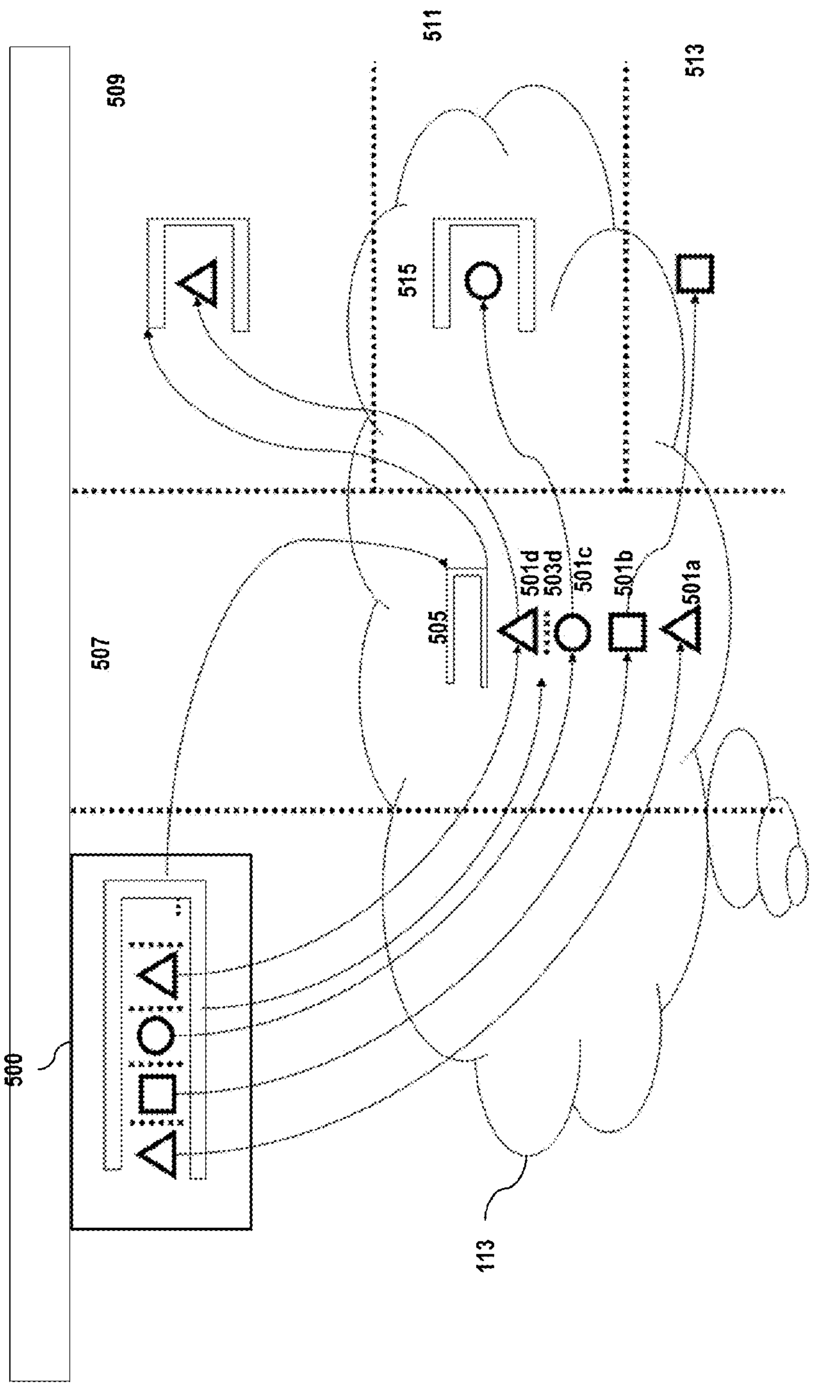
Figure 5C:
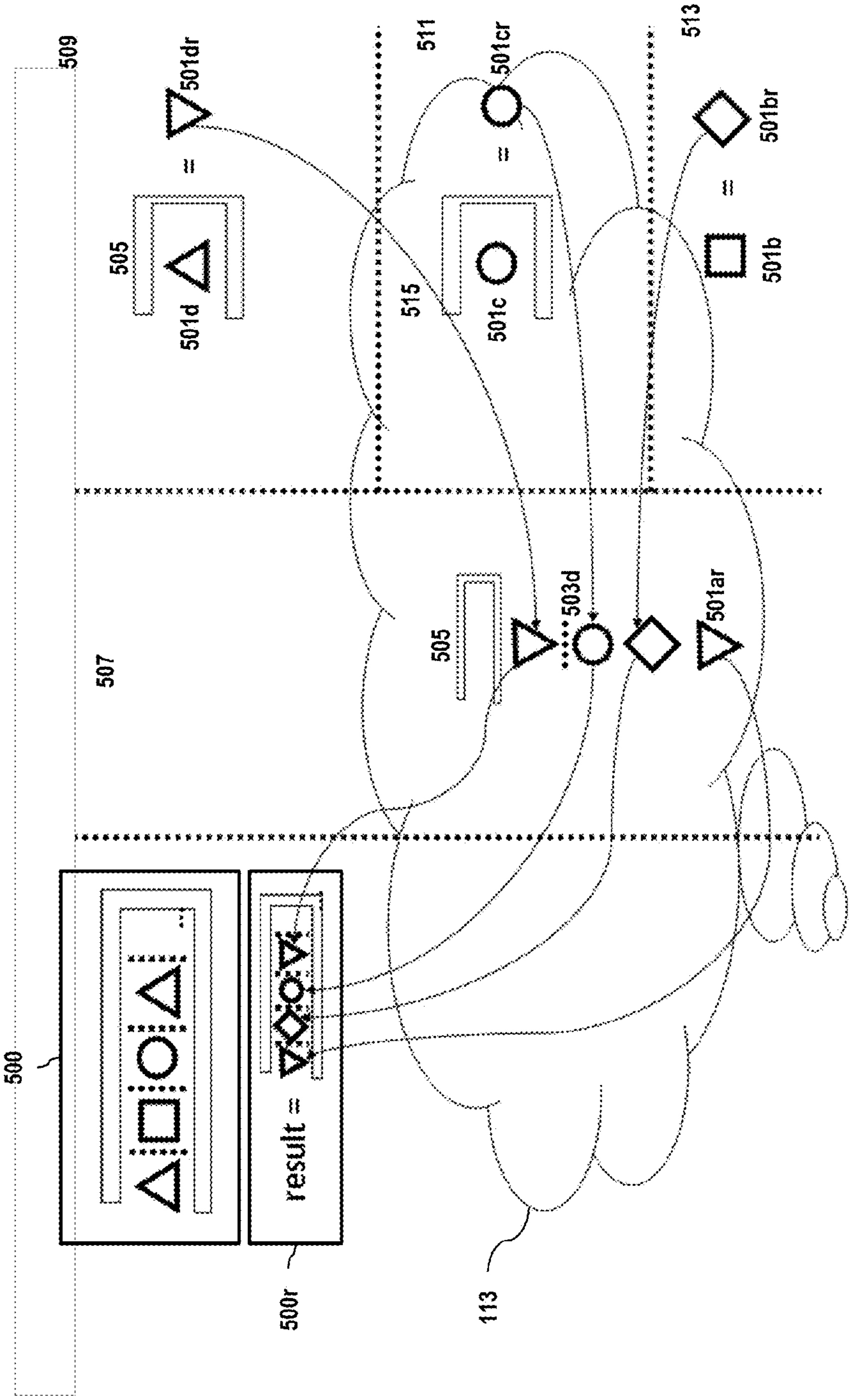

FIGS. 5A-5C are diagrams of a computation distribution, according to various embodiments. FIG. 5A shows a process as a combination of primitive closures. Process 500 includes closure primitives 501*a*-501*d*. The closure primitives 501*a*-501*d* are combined with each other into process 500 by combinators 503*a*-503*d*. The object 505 represents the execution requirements including process states under which the execution of closures 501*a*-501*d* combined by 503*a*-503*d* will result in the process 500.

FIG. 5B shows the decomposition of process 500, which can be applied. During the decomposition, closures 501*a*-501*d*, combinators 503*a*-503*d* (only 503*d* shown) and the process states 505 are migrated as independent components into, for instance, a virtual run-time environment 507 included in an information space 113 associated with process 500. The independent closures 501*a*-501*d* from run-time environment 507 may be distributed into different run-time environments 509, 511 and 513 where they may be executed. As seen in FIG. 5B, the closure 501*d* and the process states 505 have been distributed to the run-time environment 509, the closure 501*c* has been distributed into the run-time environment 511 where a process states 515 already exists. The execution of closure 501*c* in environment 511 under the process states 515 may lead to accurate results only if the process states 515 include the process states 505. The verification as to whether process states 515 can be considered as an equivalent of process states 505 is determined by the closure consistency determination module 209. Furthermore, the closure 501*b* has been distributed to the run-time environment 513 where the process states do not exist. Similarly, in this case the closure consistency determination module 209 may send a message to the distributed computation construction infrastructure 103 containing a request for correct distribution.

It is noted that the standalone property of computation closures shows that the closures are transitive meaning that the results of execution of one or more processes from a closure will also be a member of the closure.

FIG. 5C shows the aggregation of the independent closures distributed in FIG. 5C into the result 500*r* of process 500. As seen in FIG. 5C, in the virtual runtime environment 509 the closure 501*d* is combined with the process states 505 and the result closure 501*dr* is produced. Similarly process 501C is combined with the process states 515 in the run-time environment 511 and the result 501*cr* is produced. In environment 513 the closure 501*b* may be transformed utilizing the existing process states in the environment and the result is closure 501*br*. The closure 501*a* has been combined with the process states 505 in the run-time environment 507 and the result 501*ar* is produced. The resulted closures are being sent back to the run-time environment 507 where the closure aggregation module 211 aggregates all the result closures into a process 500*r* which is an equivalent of process 500. Resulting process 500*r* may be executed by another UE or by any other processor associated with the user of the initial UE (where process 500 initiated) via the information space 113.

Figure 6:
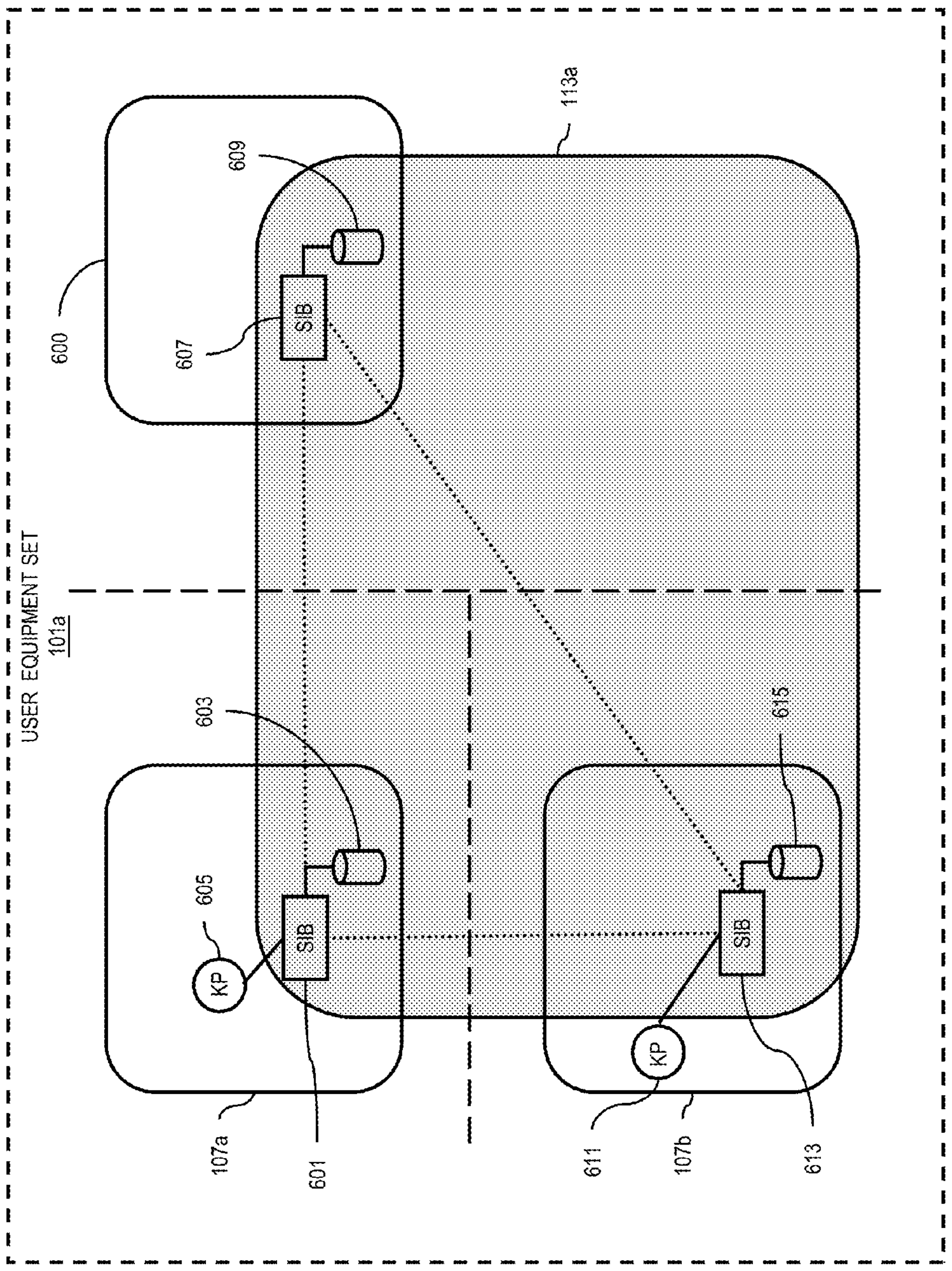
FIG. 6 is a diagram of user equipment set, according to one embodiment.

FIG. 6 is a diagram of user equipment set, according to one embodiment. As seen in FIG. 6 the user equipment set 101*a* includes UEs 107*a* and 107*b* and another device 600 which may not be a user equipment, but a part of the information space 113*a* for the user. The device 600 may for example be part of a server environment. The user may own an information space set 113*a* which is distributed between devices 107*a*, 107*b* and 600. The information space set 113*a* includes Semantic Information Brokers (SIB) 601 in UE 107*a*, the SIB 607 in device 600 and the SIB 613 in UE 107*b*. Additionally, each information space in set 113*a* has knowledge processors (KPs) 605 in UE 107*a* and 611 in UE 107*b*. Furthermore, the information space may utilize storage components 603, 609 and 615 of the devices involved in the information space. The SIBs of information space set 113*a* may communicate with each other (shown with dotted lines). Assuming that UEs 107*a* and 107*b* are located in a close proximity from each other (e.g. in an office) the user may desire to transmit processes that were initiated on one of the UEs to the other. For example, the user may start playing an online video on UE 107*a*, and realizing that the UE 107*a* does not have sufficient processing power or storage space for downloading and playing the video. The user may grab the element on the UI of the UE 107*a* representing the video and push it towards UE 107*b*. The user gesture may activate the migration process from UE 107*a* to UE 107*b* by an information management infrastructure (not shown) and as a result the video is downloaded and played on UE 107*b*, while user is able to utilize UE 107*a* for other purposes (e.g. making phone calls, text messaging, etc.). It is contemplated that an authentication procedure may need to be performed to download the video. The decomposition and aggregation of the sub-processes is done by the distributed computation construction infrastructure 103 and the execution of migrated processes is performed by KP 611 under the supervision of the information management infrastructure. Following the completion of the execution, the information management infrastructure may update the context of UE 107*a* to the state as if the video was played by UE 107*a*. Furthermore, the context of UE 107*b* may be reset to the state prior to process migration, meaning that processes that may have been halted for the execution of the migrated processes can be resumed.

Figure 7:
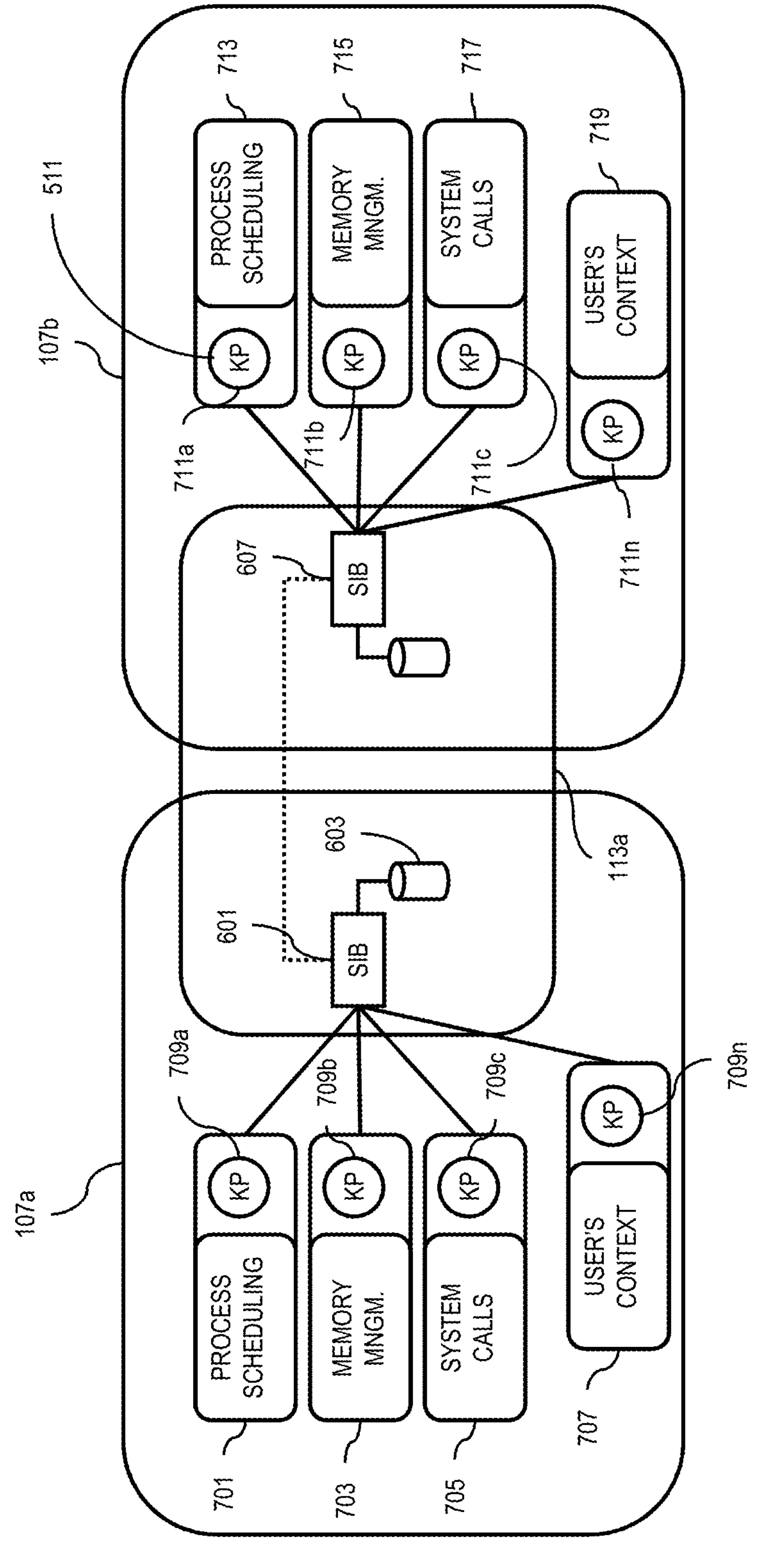
FIG. 7 is a diagram of process migration, according to one embodiment.

FIG. 7 is a diagram of process migration, according to one embodiment. Typically, during an information processing lifecycle, one or more execution contexts that may be represented in RDF form based on sub-graphs are stored by a SIB 601 of an information space 113*a*. The user context and execution context may result from execution of a program code of an application by a knowledge processor KP 709*a*-709*n* and stored in memory 603 of UE 107*a* which is utilized by SIB 601. If a KP 709*a*-709*n* of UE 107*a* detects that the UE 107*b* is attempting to communicate with UE 107*a* over a communications medium, UE 107*a* can share the user and execution contexts over a communications connection in the communications medium with UE 107*b* for continued or enhanced execution of an application by a KP 711*a*-711*n* in UE 107*b*. Following the completion of the process on UE 107*b*, the UE 107*a* may receive an alert from the SIB 601 indicating closing of the communication connection with (for example stationary wireless) UE 107*b*. In this case, UE 107*a* may receive updated user and execution contexts from the UE 107*b* over the communications connection so that the UE 107*a* can continue the execution of the application on a KP 709*a*-709*n*.

It is noted that a communications medium can be physical or logical/virtual, but all managed by an information management infrastructure (not shown) as virtual run-time environment high-context information (information processing context is seen as snapshot in the form of sub-graph). The sharing of the user and execution contexts and reflective process execution of the application on KP 711*a*-711*n* of UE 107*b* is managed by the information management infrastructure. The information management infrastructure 103 shares and provides reasoning about user and execution contexts between UE 107*a* and UE 107*b* with SIBs 601 and 607. For example UE 107*a* may be a mobile wireless device and UE 107*b* may be a stationary wireless device.

The distributed computation construction infrastructure 103 enables decomposition and aggregation of user and execution context information and scheduling of the run-time environment. This enables changes to be made to one or more user contexts 707 and 719 and execution contexts (not shown). Changes to user and execution contexts may include starting, executing, scheduling, dispersing, and aggregating of information within the environment of the information space set 113*a* processes or tasks wrapped through KPs 709*a*-709*n* and 711*a*-711*n* or other KPs functionalities such as process scheduling 701 and 713, memory management 703 and 715, system calls 705 and 717, etc.

KPs 709*a*-709*n* and 711*a*-711*n* and their corresponding information in the form of RDF sub-graph dispersion and aggregation may be performed by selective recycling apparatus of the information space set 113*a* and/or the distribution. Selective recycling may be driven by a recovery-conscious scheduler that may be part of the information space environment scheduler and supported by information provided by the computation environment processes/tasks scheduler 701 and 713. The user contexts 707 and 719 and the execution contexts (not shown) may be dynamically assigned and triggered and allocated according to a particular or operating system task management. It is noted that the terms KP and relevant information within SIB, represented as RDF sub-graph sets are abstract enough to be presented through other procedural aspects of the computation environment (e.g. a higher abstraction level).

In one embodiment, following the receipt of one or more user contexts 707 and 719 and additional execution contexts by UE 107*b* from UE 107*a*, and other relevant information over a communications medium, the UE 107*b* executes or shares the reflective state of the application by a KP 711*a*-711*n*. Upon completion of the process, the UE 107*b* may determine the information shared with SIB 607 through corresponding KP 711*a*-711*n*. This determination may result in closing a secure communication link with UE 107*a*. Prior to closing the communication connection, the UE 107*b* may share one or more user and execution contexts with UE 107*a* over the communications medium for continued execution of the application by KP 709*a*-709*n* in UE 107*a*. The sharing of the user and execution contexts and execution of the application on UE 107*a* is managed by the information management infrastructure. Such virtual run-time environment enables shared user and execution context sessions between UE 107*a* and UE 107*b*.

In another embodiment, prior to closing of the communication connection, the UE 107*b* may share an initial portion of the updated user and execution context with UE 107*a* over a initial communication connection and share the remaining portion of the updated user and execution contexts with UE 107*a* over the last communication connection for continued execution of the application on UE 107*a*. The adaptive computation platform described enables granular information processing context migration capability for a computing device to enhance the processing power of the devices within the information space environment.

Figure 8:
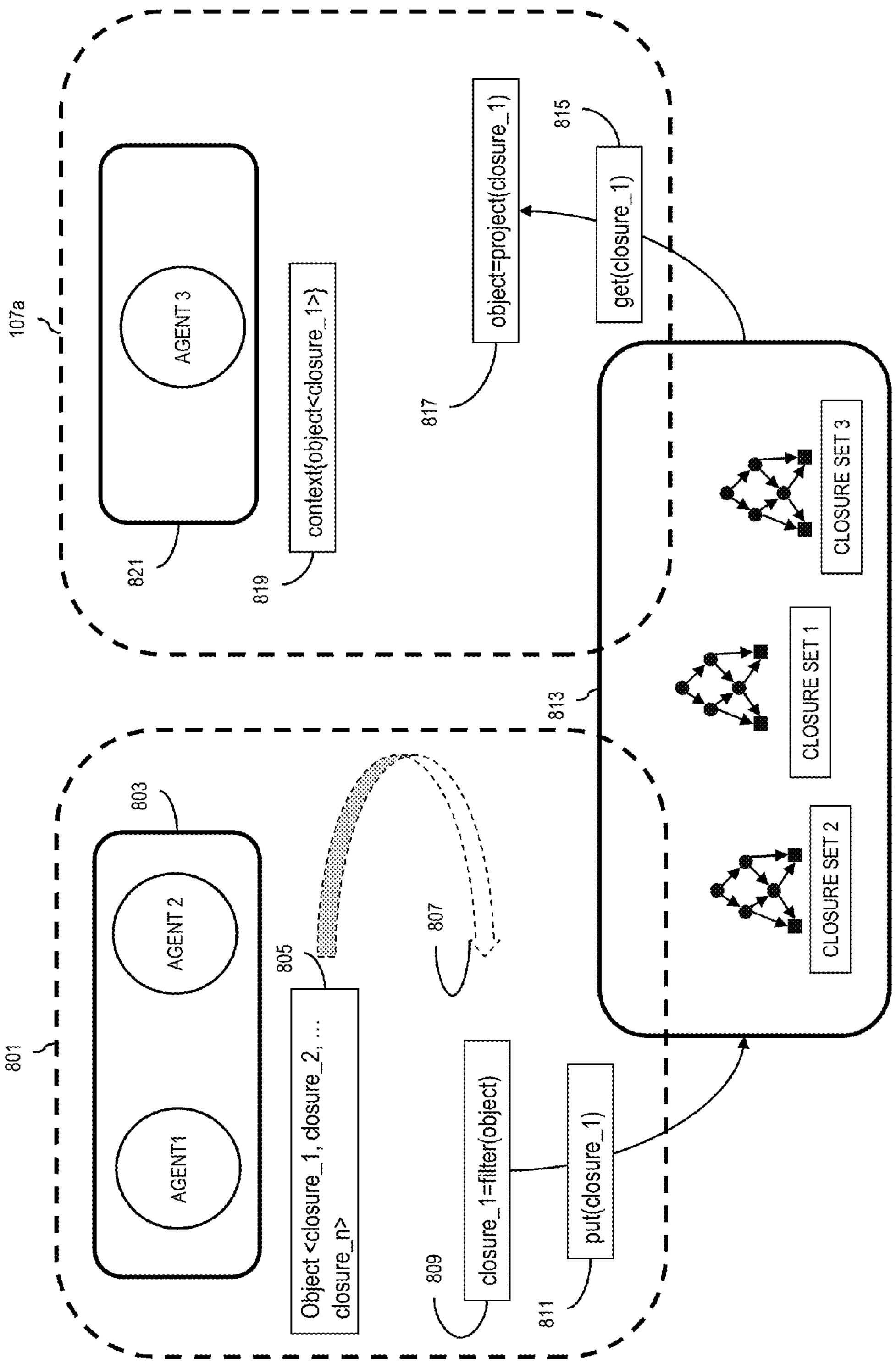
FIG. 8 is a diagram of process migration from a device to another device, according to one embodiment.

FIG. 8 is a diagram of process migration from a device to another device, according to one embodiment. In one embodiment, the backend device 801 may be a virtual run-time environment within the user's information spaces 113*a*-113*n* or on one UE 107 associated with the user. The backend device 801 may include a user context 803 for every user equipment 107*a*-107*i* connected to the backend device 801. The user context 803 may be a copy of the user context 821 for each device 107*a* which is being migrated among devices. Agent1 and agent2 are processors that calculate and handle computation closures within the user context 803. The number of agents may be different in different devices based on their design, functionality, processing power, etc. Block 805 represents an Object as a set of computation closures, closure_1, closure_2, . . . , and closure_n, where each closure is a component of a larger process, for example, related to a service provided to the user by the user equipment 107*a*. The closures may be generated by the closure definition module 205 of the distributed computation construction infrastructure 103 and each closure is a standalone process that can be executed independently from the other closures. In the example of FIG. 8, the filtering process 807 extracts closure_1 from the closure set Object via filtering the set (shown in block 809) by the execution context decomposition module 203. The extracted closure_1 is added to a computation closure store 813 using the exemplary Put command 811.

In this example, assuming that the extracted computation closure, closure_1 is supposed to be executed on the user equipment 107*a*, the user equipment 107*a* extracts the computation closure closure_1 from the computation closure store 813 using the Get command 815.

In one embodiment, the decision of the equipment on which a computation closure is executed, may be made by a user by pushing, or flicking specific icons of the user interface associated with a process on one user equipment towards another user equipment (e.g. 107*a*). In another embodiment, the equipment executing a computation closure may be automatically assigned. The extracted closure_1 is projected into a closure with the user device context (process states) and the object 817 is produced. The block 819 represents the reconstruction of the closure into the initial context by the closure aggregation module 211. The aggregated context may then be executed in the run-time environment 821 of UE 107*b* by Agent3.

In another embodiment, the block 803 may be a user equipment and block 821*a* backend device or both blocks 801 and 821 may be UEs. In this embodiment the decomposition and aggregation processes are similar to the above example with the difference that closure_1 is extracted from a process on the UE 801.

Figure 9:
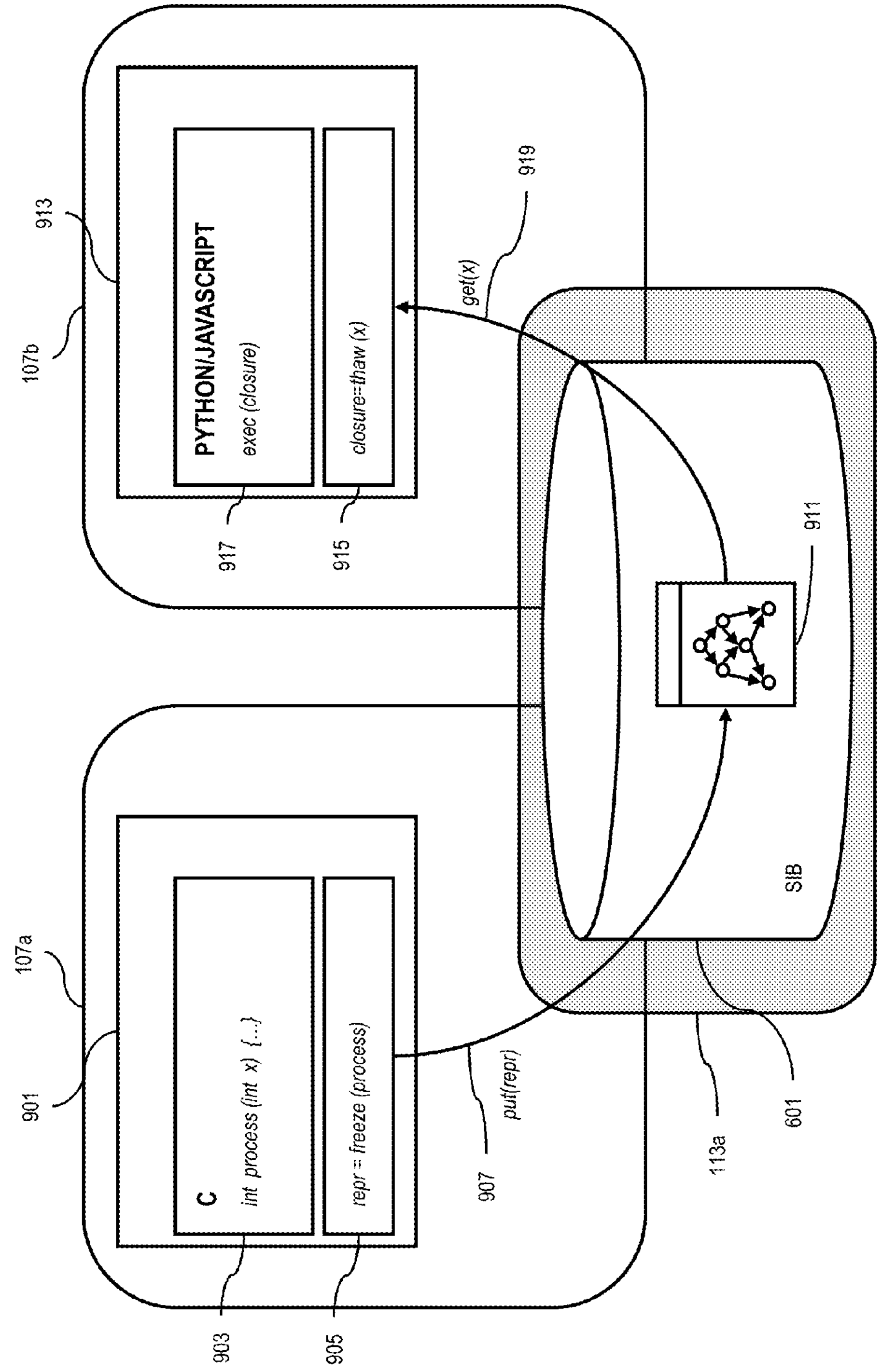
FIG. 9 is a diagram of granular process migration, according to one embodiment.

FIG. 9 is a diagram of granular process migration, according to one embodiment. As seen in FIG. 9, UE 107*a* contains a process 901 which includes codes 903 and 905 (for example written in C programming language). Assuming that a user of a UE 107*a* has requested that a process (process) to be migrated to a UE 107*b* (e.g., by performing a gesture indicating movement from the UE 107*a* to the UE 107*b*). The user gesture activates codes 903 and 905 where the code 903 activates the distributed computation construction infrastructure 103 As described in FIG. 2, the execution context determination module 201 determines context x for the process, the context is decomposed by the execution context decomposition module 203 and the closure definition module 205 determines the computation closure that binds the process. Subsequently, the information is converted into RDF format by the closure serialization module 207 of the distributed computation construction infrastructure 103. The code 905 freezes the process which may halt the execution of process on UE 107*a*. Following the freeze, per arrow 907 the information regarding the process (including the identification, the context decomposed by the execution context decomposition module 203 and the closures defined by closure definition module 205) is transmitted to an information space from set 113*a* and stored in an RDF form 911 by the SIB 601. Furthermore, the information identifying the targeted virtual run-time environment as selected by the user (for example, by gesturing towards a certain UE) may be also transmitted and stored by the SIB 601. Arrow 919 represents the process migration into the UE 107*b* which may include the aggregation of closures by the closure aggregation module 211. The migration processing codes 915 and 917 of UE 107*b*, which may be parts of a larger process 913, and may be written in languages different from the codes 903 and 905 in UE 107*a* (e.g. Python® or JavaScript®), enable the migration of the process into the UE 107*b*.

Upon receiving the process migration information x at the UE 107*b*, execution of the code 915 on the received information may activate the closure aggregation module 211 from the distributed computation construction infrastructure 103 to reconstruct the process information including the context. The closure consistency determination module 209 may also check the consistency of the received information with the receiving platform UE 107*b*. If the consistency requirement is met, the context reconstruction may be performed according to the RDF 911 in SIB 601. Execution of the code 917 on the UE 107*b* may trigger resumption of the execution of migrated process by the new platform UE 107*b*.

Figure 10:
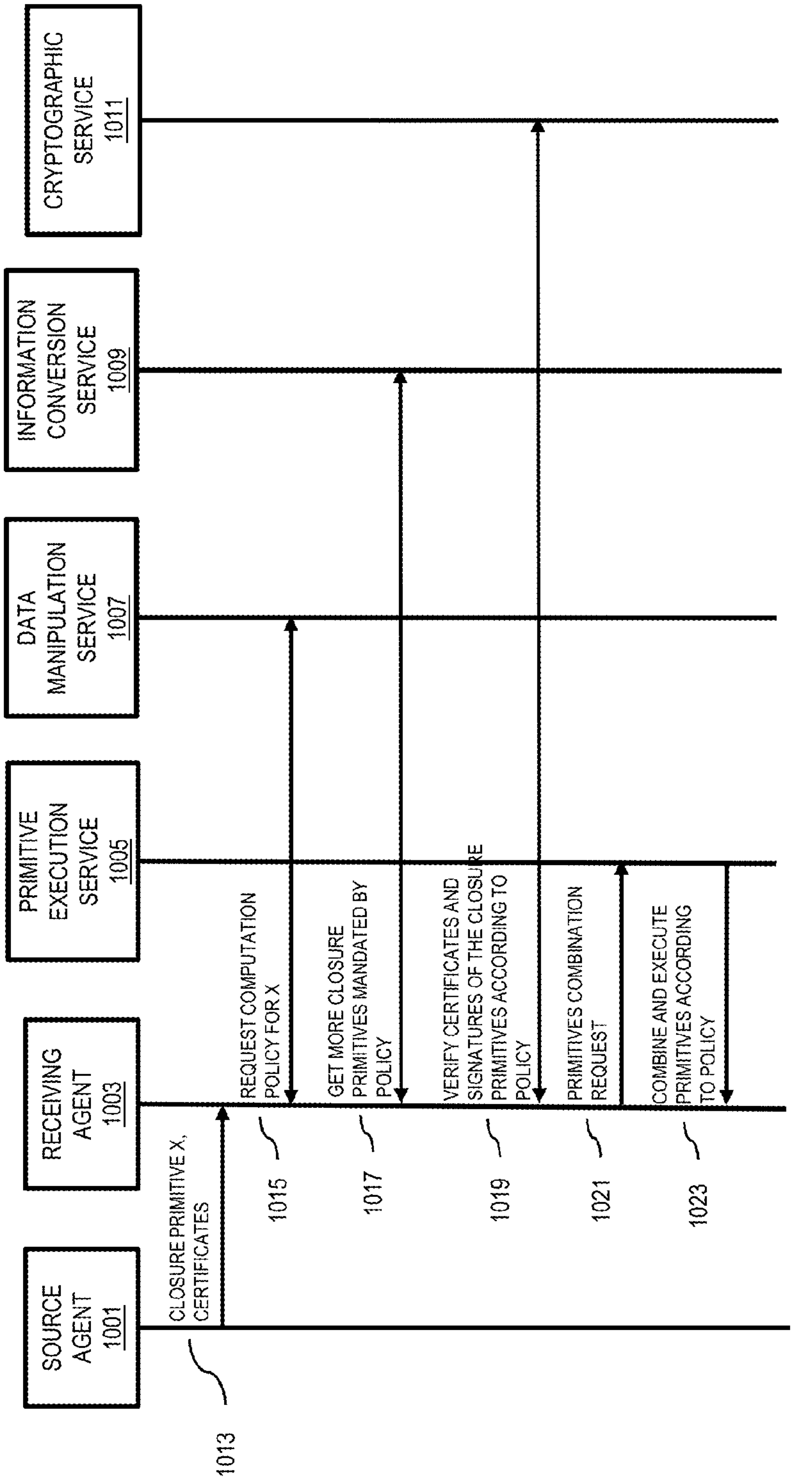
FIG. 10 is a diagram of policy application in computation distribution, according to one embodiment.

FIG. 10 is a diagram of policy application in computation distribution, according to one embodiment. The components involved in the migration process include the source agent 1001. The source agent 1001 is an agent on a UE 107*a*-107*n* where the initial context is being executed. The receiving agent 1003 is an agent on the receiving side of the migration. The receiving side may be another UE 107*a*-107*n*, a backend device, a processing component of the information space 113, etc. As per function 1013, the source agent 1001 sends one or more certificates associated with one or more closure primitives X defined by the closure definition module 205 to the receiving agent 1003. The certificates may be used for verifying the authenticity of the closure primitives X.

The receiving agent 1003, sends a request for a data manipulation service 1007 via function 1015, and receives as a result from data manipulation service 1007 a computation policy P regarding the closure primitives X. The computation policy may include regulations, access rights, execution rights, or any policies that may affect the execution of the closure primitives X. The receiving agent 1003 may get more closure primitives mandated by policy P through the information conversion service 1009 per step 1017. In one embodiment, the information conversion service 1009 may work under the supervision of the distributed computation construction infrastructure 103.

Per function 1019, the receiving agent 1003 utilizes a cryptographic service 1011 to verify the authenticity of the certificates received for closure primitives X according to the received policy P. If the certificates are approved, per step 1021 the receiving agent 1003 requests for a primitive execution service 1005 for the combination of closure primitives. As discussed in FIG. 2A the combination may be done by the closure aggregation module 211. The closure aggregation module 211 aggregates the closure primitives according to the policy P and the combined and executed primitives are sent to the receiving agent 1003 per step 1023.

The processes described herein for authenticating based on biometric data may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
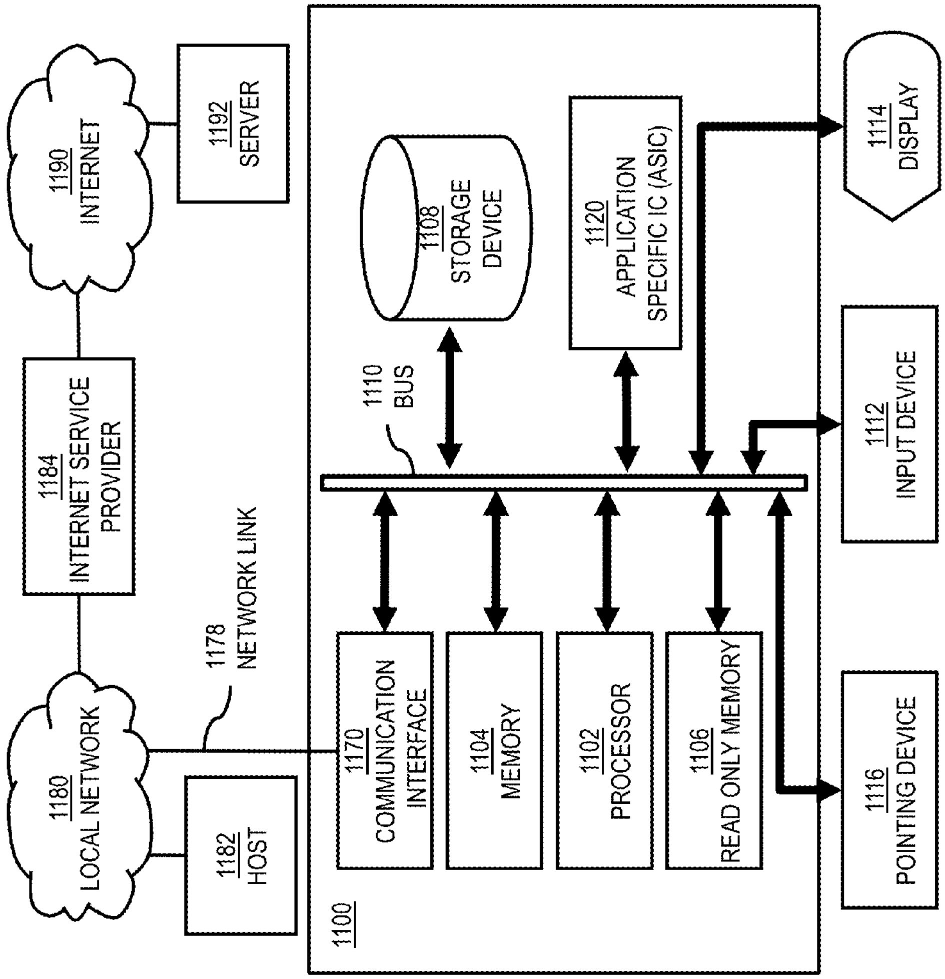
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to construct distributed computations as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of construction and aggregation of distributed computations.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to construction and aggregation of distributed computations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for construction and aggregation of distributed computations. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for construction and aggregation of distributed computations, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device

1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for distributed computation construction and aggregation to the UE set 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to construct distributed computations as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of services. Chip set or chip 1200, or a portion thereof, constitutes a means for performing one or more steps of construction and aggregation of distributed computations.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to construct distributed computations. The memory 1205 also stores the data associated with or generated by the execution of the inventive steps.

Figure 13:
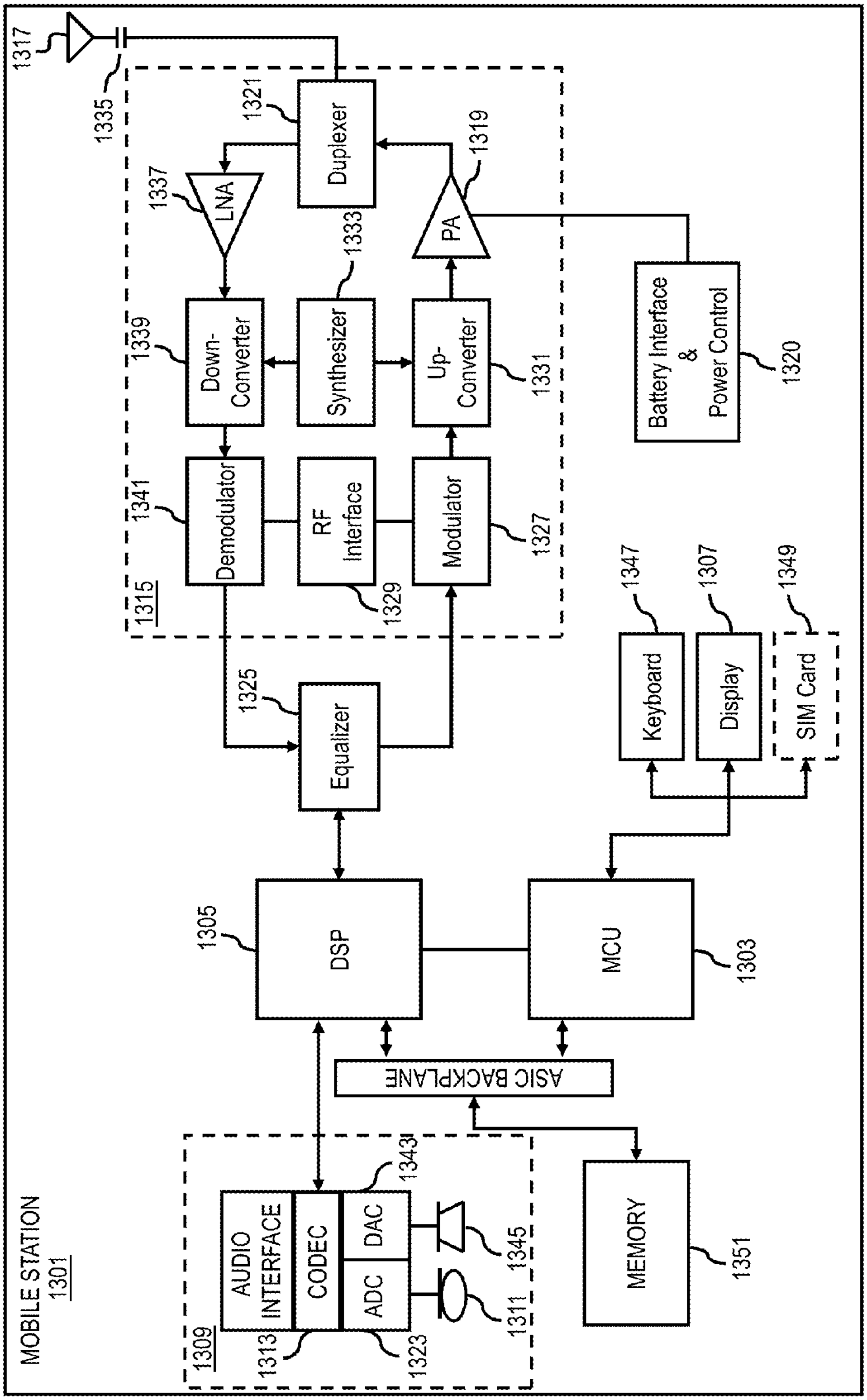
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1A, according to one embodiment. In some embodiments, mobile terminal 1300, or a portion thereof, constitutes a means for performing one or more steps of construction and aggregation of distributed computations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of construction and aggregation of distributed computations. The display 13 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to construct distributed computations. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

determining biometric data from a user equipment associated with a user;

causing decomposition of the biometric data into one or more closure primitives that represent computation closures of one or more processes of the user equipment;

selectively authenticating the user based on the decomposition of the biometric data, wherein the authenticating comprises verifying semantic information;

retrieving media to provide to the user equipment as part of a challenge procedure, wherein the media includes textual information, an image, or a combination thereof;

determining to transmit the media to the user equipment to obtain a response to the challenge procedure, wherein the response includes the biometric data;

wherein the biometric data includes a voiceprint, an utterance, and the textual information includes one or more words;

verifying the voiceprint as part of the challenge procedure;

verifying the textual information based on the voiceprint as part of the challenge procedure; and verifying the semantic information presented in the utterance as part of the challenge procedure.

2. The method of claim 1, further comprising:

tracking a response period associated with the response to the challenge procedure; and determining a failed authentication based on the response period.

3. The method of claim 1, wherein the voiceprint further represents one or more utterances associated with a spelling of the one or more words, the method further comprising:

mapping the one or more utterances to one or more words stored in a dictionary database.

4. The method of claim 3, the method further comprising:

randomly selecting the one or more words from the dictionary database.

5. The method of claim 1, wherein the challenge procedure is a second challenge procedure, the method further comprising:

initiating a first challenge procedure to authenticate the user; and initiating the second challenge procedure using the biometric data to authenticate the user, wherein the second challenge procedure is initiated if the first challenge procedure fails to complete within a predetermined time period.

6. An apparatus comprising:

at least one processor; and at least one memory including computer program code, the at least one memory and the computer program code configured to, with the at least one processor, cause the apparatus to perform at least the following, determine biometric data from a user equipment associated with a user, cause decomposition of the biometric data into one or more closure primitives that represent computation closures of one or more processes of the user equipment, selectively authenticate the user based on the decomposition of the biometric data, wherein the authenticating comprises verifying semantic information;

retrieve media to provide to the user equipment as part of a challenge procedure, wherein the media includes textual information, an image, or a combination thereof;

determine to transmit the media to the user equipment to obtain a response to the challenge procedure, wherein the response includes the biometric data;

wherein the biometric data includes a voiceprint, an utterance, and the textual information includes one or more words, verify the voiceprint as part of the challenge procedure;

verify the textual information based on the voiceprint as part of the challenge procedure; and verify the semantic information presented in the utterance as part of the challenge procedure.

7. The apparatus of claim 6, wherein the apparatus is further caused to perform:

track a response period associated with the response to the challenge procedure; and determine a failed authentication based on the response period.

8. The apparatus of claim 6, wherein the voiceprint further represents one or more utterances associated with a spelling of the one or more words, and the apparatus is further caused to perform:

map the one or more utterances to the one or more words stored in a dictionary database.

9. The apparatus of claim 8, further configured to randomly select the one or more words from a dictionary database.

10. The apparatus of claim 6, wherein the challenge procedure is a second challenge procedure, and the apparatus is further caused to perform:

initiate a first challenge procedure to authenticate the user; and initiate the second challenge procedure using the biometric data to authenticate the user, wherein the second challenge procedure is initiated if the first challenge procedure fails to complete within a predetermined time period.

11. A method comprising:

receiving, at a user equipment, an input signal representing biometric data associated with a user;

generating a message including the biometric data for transmission to an authentication service, the biometric data being decomposed into one or more closure primitives that represent computation closures of one or more processes of the user equipment, wherein the user is authenticated based on the decomposition of the biometric data, and wherein the user is authenticated based on verifying semantic information;

receiving a request for the biometric data as part of a challenge procedure, wherein the request specifies media that includes textual information, an image or a combination thereof;

wherein the biometric data is provided as part of the message in response to the request specifying the media;

wherein the input signal provides a voiceprint, an utterance, and the textual information includes one or more words;

verifying the voiceprint as part of the challenge procedure;

verifying the textual information based on the voiceprint as part of the challenge procedure; and verifying the semantic information presented in the utterance as part of the challenge procedure.

12. The method of claim 11, wherein the voiceprint further represents one or more utterances associated with a spelling of the textual information or a description of the image.

13. The method of claim 11, wherein the challenge procedure is executed after another challenge procedure is terminated based on expiration of a predetermined timer value.

14. An apparatus comprising:

at least one processor; and at least one memory including computer program code for one or more programs;

the at least one memory and the computer program code configured to, with the at least one processor, cause the apparatus to perform at least the following, receive, at a user equipment, an input signal representing biometric data associated with a user, generate a message including the biometric data for transmission to an authentication service, the biometric data being decomposed into one or more closure primitives that represent computation closures of one or more processes of the user equipment, wherein the user is authenticated based on the decomposition of the biometric data, and wherein the user is authenticated based on verifying semantic information;

receive a request for the biometric data as part of a challenge procedure, wherein the request specifies media that includes textual information, an image, or a combination thereof;

wherein the biometric data is provided as part of the message in response to the request specifying media;

wherein the input signal provides a voiceprint, an utterance, and the textual information includes one or more words;

verifying the voiceprint as part of the challenge procedure;

verifying the textual information based on the voiceprint as part of the challenge procedure; and verifying the semantic information presented in the utterance as part of the challenge procedure.

15. The apparatus of claim 14, wherein the voiceprint further represents one or more utterances associated with a description of the image.

16. The apparatus of claim 14, wherein the challenge procedure is executed after another challenge procedure is terminated based on expiration of a predetermined timer value, and wherein the authentication service further comprises a semantic module configured to process the semantic information.

* * * * *